United States Patent
Urano et al.

(10) Patent No.: US 12,266,035 B2
(45) Date of Patent: Apr. 1, 2025

(54) REMOTE IMAGE DISPLAY METHOD AND REMOTE IMAGE DISPLAY SYSTEM

(71) Applicant: TOYOTA JIDOSHA KABUSHIKI KAISHA, Toyota (JP)

(72) Inventors: Hiromitsu Urano, Numazu (JP); Sho Otaki, Yokohama (JP); Hojung Jung, Sunto-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 173 days.

(21) Appl. No.: 18/155,167

(22) Filed: Jan. 17, 2023

(65) Prior Publication Data

US 2023/0260169 A1  Aug. 17, 2023

(30) Foreign Application Priority Data

Feb. 16, 2022  (JP) ................. 2022-022302

(51) Int. Cl.
*G06T 15/00* (2011.01)
*G06T 11/00* (2006.01)
*G06T 11/20* (2006.01)

(52) U.S. Cl.
CPC .......... *G06T 11/001* (2013.01); *G06T 11/203* (2013.01); *G06T 2210/12* (2013.01)

(58) Field of Classification Search
CPC .. G06T 11/203; G06T 11/001; G06T 2210/12
USPC ........................................ 345/418
See application file for complete search history.

(56) References Cited

U.S. PATENT DOCUMENTS

| 11,034,299 | B2 | 6/2021 | Peterson et al. |
| 11,697,380 | B2* | 7/2023 | Lee .......... B60R 11/04 701/1 |
| 11,697,408 | B2* | 7/2023 | Yamanaka .......... B60K 35/00 701/23 |
| 2011/0025489 | A1 | 2/2011 | Shimoda et al. |
| 2021/0230836 | A1 | 7/2021 | Ding et al. |

FOREIGN PATENT DOCUMENTS

| JP | H09-271016 A | 10/1997 |
| JP | 2011-035729 A | 2/2011 |
| JP | 2020-072401 A | 5/2020 |
| JP | 2020-161039 A | 10/2020 |

OTHER PUBLICATIONS

CCTV Camera Pro, View Multiple Security Camera Locations from Mac and Windows, Nov. 19, 2021, https://www.youtube.com/watch?v=sMmc53cYVbg.*

* cited by examiner

*Primary Examiner* — Phu K Nguyen
(74) *Attorney, Agent, or Firm* — Oliff PLC

(57) ABSTRACT

A sensor image generated based on data obtained from a remote sensor is displayed on a display of a terminal communicating with the remote sensor. The remote sensor includes a sensor mounted on a moving body. The sensor image includes a moving body image representing an image generated based on data obtained from the sensor mounted on the moving body. In the moving body image, right and left regions are set with respect to front of the moving body. Right and left recognition assistances are superimposed respectively on the right and left regions. A color of the right recognition assistance is different from a color of the left recognition assistance.

14 Claims, 24 Drawing Sheets

REMOTE IMAGE DISPLAY METHOD AND REMOTE IMAGE DISPLAY SYSTEM

The present disclosure claims priority under 35 U.S.C. § 119 to Japanese Patent Application No. 2022-22302, filed on Feb. 16, 2022, the content of which application is incorporated herein by reference in their entirety.

TECHNICAL FIELD

The present disclosure relates to a method and a system that display a sensor image generated based on data obtained from a remote sensor on a terminal communicating with the remote sensor.

BACKGROUND

U.S. patent Ser. No. 11/034,299 discloses a system which includes two electronic mirrors provided to both sides of a driver seat of a vehicle. The system in related art outputs images of a right side and right rear of the vehicle from a right electronic mirror and outputs images of a left side and left rear of the vehicle from a left electronic mirror. In a case where another vehicle approaching from the rear of the vehicle is recognized, the system in related art superimposes an enlarged image of the other vehicle in a part of a region of an image including the other vehicle.

In addition to U.S. patent Ser. No. 11/034,299, examples of prior arts related to the present disclosure include JP 2020-72401 A, JP H9-271016 A, JP 2020-161039 A, and JP 2011-35729 A.

In a system in the prior art, a driver seated on a driver seat can instinctively know from which of right rear or left rear of a vehicle another vehicle approaches. This is because the driver understands that the above electronic mirrors have functions of side mirrors and can instantly understand a position of the other vehicle based on an installation position of the electronic mirror which outputs an image including the other vehicle.

A situation will be considered where remote work of a moving body represented by a vehicle is performed. In the remote work, a sensor image is generated based on data obtained from a sensor of the moving body, and the image is provided to an operator. As the sensor image, an image of a front center and an image of a rear center of the moving body may be raised as examples. Typically, the images of the front center and the rear center are generated based on data obtained by cameras mounted on the moving body.

Here, a problem is that with respect to the front of the moving body, the operator possibly makes wrong decision about the fact that a right region of the image of the rear center corresponds to "left" of the moving body and a left region of this image corresponds to "right" of the moving body. Further, when the image of the front center is misunderstood as the image of the rear center, the operator possibly makes wrong decision about the fact that a right region of the image of the front center corresponds to "right" of the moving body and a left region of this image corresponds to "left" of the moving body.

One object of the present disclosure is to provide a technique that is capable of reducing occurrences of trouble that an operator who performs remote work based on a sensor image makes wrong decision about left and right with respect to the front of a moving body.

SUMMARY

A first aspect of the present disclosure is a remote image display method to display a sensor image generated based on data obtained from a remote sensor on a display of a terminal communicating with the remote sensor and has the following features.

The remote sensor includes a sensor mounted on a moving body.

The sensor image including a moving body image representing an image generated based on data obtained from the sensor mounted on the moving body.

The remote image display method comprises the steps of:
setting a reference line which extends in a front-rear direction of the moving body on a virtual horizontal plane which passes through a reference point of the moving body;
defining right and left spaces with respect to front of the moving body in a virtual space which includes the virtual horizontal plane by using the reference line;
setting right and left regions with respect to the front of the moving body in the moving body image by using the virtual space in which the right and left spaces are defined;
superimposing right and left recognition assistances respectively on the right and left regions of the moving body image, in which a color of the right recognition assistance is different from a color of the left recognition assistance; and
outputting the moving body image on which the right and left recognition assistances are superimposed from the display.

A second aspect of the present disclosure is the remote image display method in the first aspect and has the following features.

The right and left recognition assistances include coloring applied to circular arcs concentrically drawn on the virtual horizontal plane around the reference point of the moving body, coloring applied to at least a part of each region of the right and left regions, coloring applied to a static object which is recognized in the moving body image, coloring applied to a bounding box which surrounds a dynamic object recognized in the moving body image, coloring applied to a track of the dynamic object, and coloring applied to a track of the moving body.

A third aspect of the present disclosure is the remote image display method in the second aspect and has the following features.

The right and left recognition assistances are provided as a combination of at least one which is selected from the coloring applied to the circular arcs, the coloring applied to at least a part of each region of the right and left regions, the coloring applied to the static object, and the coloring applied to the track of the moving body and at least one which is selected from the coloring applied to the bounding box and the coloring applied to the track of the dynamic object.

A fourth aspect of the present disclosure is the remote image display method in the second aspect and has the following features.

The remote image display method further comprises the steps of:
determining whether or not a dynamic object across a boundary which separates the right region from the left region is recognized in the moving body image; and
doubling the bounding box which surrounds the dynamic object across the boundary and of applying colors of the right and left recognition assistances respectively to the bounding boxes when a determination is made that the dynamic object across the boundary is recognized in the moving body image.

A fifth aspect of the present disclosure is the remote image display method in the second aspect and has the following features.

The remote image display method further comprises the steps of:
  determining whether or not a dynamic object across a boundary which separates the right region from the left region is recognized in the moving body image; and
  applying a different color from colors of both of the right and left recognition assistances to the bounding box which surrounds the dynamic object across the boundary when a determination is made that the dynamic object across the boundary is recognized in the moving body image.

A sixth aspect of the present disclosure is the remote image display method in the second aspect and has the following features.

The remote image display method further comprises the steps of:
  determining whether or not the total number of dynamic objects is equivalent to or greater than an upper limit; and
  selecting dynamic objects to which the bounding boxes are given in accordance with a predetermined criterion when it is determined that the total number is equivalent to or greater than the upper limit.

A seventh aspect of the present disclosure is the remote image display method in the first aspect and has the following features.

The moving body image includes front and rear images of the moving body.

The step of superimposing the right and left recognition assistances on the moving body image further includes the steps of:
  setting similar colors to a color of the right recognition assistance to be superimposed on the front image and to a color of the right recognition assistance to be superimposed on the rear image; and
  setting similar colors to a color of the left recognition assistance to be superimposed on the front image and to a color of the left recognition assistance to be superimposed on the rear image.

An eighth aspect of the present disclosure is the remote image display method in the seventh aspect and has the following features.

The remote image display method further comprises the steps of:
  determining whether or not the number of dynamic objects recognized in each of the right and left regions of the front image is equivalent to or greater than one;
  determining whether or not a dynamic object is recognized in at least one of the right and left regions of the rear image; and
  employing coloring applied to a bounding box which surrounds a dynamic object recognized in the front and rear images as the right and left recognition assistances when a determination is made that the number of dynamic objects recognized in each of the right and left regions of the front image is equivalent to or greater than one and that a dynamic object is recognized in at least one of the right and left regions of the rear image.

A ninth aspect of the present disclosure is the remote image display method in the first aspect and has the following features.

A boundary which separates the right region from the left region includes a boundary which has a predetermined shape.

The remote image display method further comprises the step of superimposing the recognition assistance on the boundary which has the predetermined shape, in which a color of the recognition assistance to be superimposed on the boundary which has the predetermined shape is different from colors of both of the right and left recognition assistances.

A tenth aspect of the present disclosure is the remote image display method in the first aspect and has the following features.

The sensor image includes an infrastructure image representing an image generated based on data obtained from an infrastructure camera whose distance from the moving body is equivalent to or less than a predetermined value.

The terminal further includes a display which displays the infrastructure image.

The remote image display method further comprises the steps of:
  setting right and left regions with respect to the front of the moving body in the infrastructure image by using the virtual space in which the right and left spaces are defined;
  superimposing right and left recognition assistances respectively on the right and left regions of the infrastructure image, in which a color of the right recognition assistance to be superimposed on the infrastructure image is a similar color to a color of the right recognition assistance to be superimposed on the moving body image and a color of the left recognition assistance to be superimposed on the infrastructure image is a similar color to a color of the left recognition assistance to be superimposed on the moving body image; and
  outputting the infrastructure image on which the right and left recognition assistances are superimposed from the display which displays the infrastructure image.

An eleventh aspect of the present disclosure is the remote image display method in the tenth aspect and has the following features.

The remote image display method further comprises the steps of:
  setting an additional reference line which is orthogonal to the reference line on the virtual horizontal plane; and
  defining right front, left front, right rear, and left rear spaces by dividing, into two parts, each of the right and left spaces in the front-rear direction of the moving body by using the additional reference line.

When the right front, left front, right rear, and left rear spaces are defined, in the step of setting the right and left regions with respect to the front of the moving body in the infrastructure image, right front, left front, right rear, and left rear regions with respect to the front of the moving body are set in the infrastructure image.

When the right front, left front, right rear, and left rear spaces are defined, in the step of superimposing the right and left recognition assistances respectively on the right and left regions of the infrastructure image, right front, left front, right rear, and left rear recognition assistances are superimposed respectively on the right front, left front, right rear, and left rear regions.

A color of the right front recognition assistance to be superimposed on the infrastructure image is different from a color of the right rear recognition assistance, and a color of the left front recognition assistance to be superimposed on the infrastructure image is different from a color of the left rear recognition assistance.

A twelfth aspect of the present disclosure is the remote image display method in the first aspect and has the following features.

The terminal further includes a display which displays a map image of a periphery of the moving body.

The remote image display method further comprises the steps of:

superimposing on the map image an icon of the moving body and right and left pictograms which surround the icon of the moving body with respect to the front of the moving body, in which a color of the right pictogram is a similar color to a color of the right recognition assistance to be superimposed on the moving body image and a color of the left pictogram is a similar color to a color of the left recognition assistance to be superimposed on the moving body image; and outputting the map image on which the icon of the moving body and the right and left pictograms are superimposed from the display which displays the map image.

A thirteenth aspect of the present disclosure is a remote image display method to display a sensor image generated based on data obtained from a remote sensor on a display of a terminal communicating with the remote sensor and has the following features.

The sensor image includes an infrastructure image representing an image generated based on data obtained from an infrastructure camera whose distance from the moving body is equivalent to or less than a predetermined value.

The remote image display method comprises the steps of:

setting a reference line which extends in a front-rear direction of the moving body on a virtual horizontal plane which passes through a reference point of the moving body;

defining right and left spaces with respect to front of the moving body in a virtual space which includes the virtual horizontal plane by using the reference line;

setting right and left regions with respect to the front of the moving body in the infrastructure image by using the virtual space in which the right and left spaces are defined;

superimposing right and left recognition assistances respectively on the right and left regions of the infrastructure image, in which a color of the right recognition assistance is different from a color of the left recognition assistance; and outputting the infrastructure image on which the right and left recognition assistances are superimposed from the display.

A fourteen aspect of the present disclosure is a remote image display system to display a sensor image generated based on data obtained from a remote sensor on a display of a terminal communicating with the remote sensor and has the following features.

The remote sensor includes a sensor mounted on a moving body.

The sensor image includes a moving body image representing an image generated based on data obtained from the sensor mounted on the moving body.

The moving body is configured to:

set a reference line which extends in a front-rear direction of the moving body on a virtual horizontal plane which passes through a reference point of the moving body;

define right and left spaces with respect to front of the moving body in a virtual space which includes the virtual horizontal plane by using the reference line;

set right and left regions with respect to the front of the moving body in the moving body image by using the virtual space in which the right and left spaces are defined; and superimpose right and left recognition assistances respectively on the right and left regions of the moving body image, a color of the right recognition assistance being different from a color of the left recognition assistance; and transmit the moving body image on which the right and left recognition assistances are superimposed to the terminal.

The terminal is configured to output the moving body image on which the right and left recognition assistances are superimposed from the display.

According to the first or fourteenth aspect, the right and left regions with respect to the front of the moving body are set in the moving body image, the moving body image colored with different colors on right and left is output from the display. Consequently, it becomes possible to reduce occurrences of trouble that an operator makes a wrong recognition of left and right with respect to the front of the moving body in the moving body image.

According to the second aspect, as the right and left recognition assistances, the coloring applied to the circular arcs, the coloring applied to at least a part of each region of the right and left regions, the coloring applied to a static object, the coloring applied to the bounding box which surrounds a dynamic object, the coloring applied to the track of the dynamic object, and the coloring applied to the track of the moving body can be used.

When a dynamic object is not recognized in the moving body image, the bounding box which surrounds a dynamic object is not superimposed on the moving body image. Thus, the operator possibly makes a wrong recognition of left and right with respect to the front of the moving body. Further, when the number of recognized dynamic objects is small and a case where the recognized dynamic objects are unevenly present in the right or the left region, a similar problem occurs. In this point, according to the third aspect, the recognition assistance for at least one of the bounding box and the track of the dynamic object on the presumption that a dynamic object is recognized is combined with at least one of the other recognition assistances than those. Consequently, it becomes possible to beforehand avoid an occurrence of the above-described problems.

When the bounding box which surrounds a dynamic object is used as the recognition assistance, what kind of bounding box is given to a dynamic object across the boundary separating the right region from the left region becomes a problem. In this point, according to the fourth aspect, the colors of the right and left recognition assistances can be applied respectively to the doubled bounding boxes. Further, in the fifth aspect, a different color from the colors of both of the right and left recognition assistances can be applied to the bounding box which surrounds the dynamic object across the boundary. Consequently, according to the fourth or fifth aspect, it becomes possible to give a proper bounding box to the dynamic object across the boundary.

When many dynamic objects are recognized in the moving body image, there is a problem that the bounding boxes which surround those lower visibility. In this point, according to the sixth aspect, when the total number of dynamic objects is equivalent to or greater than the upper limit, dynamic objects to which the bounding boxes are given can be selected in accordance with a predetermined criterion. Consequently, the number of bounding boxes to be superimposed on the moving body image is decreased to a proper number, and it thereby becomes possible to inhibit lowering of visibility due to the bounding boxes.

According to the seventh aspect, similar colors are set to the right recognition assistances in the front and rear images, and similar colors are set to the left recognition assistances. Consequently, it becomes possible to reduce occurrences of trouble that the operator makes a wrong recognition of left and right, with respect to the front of the moving body, in the front and rear images.

The problems described in the fourth and fifth aspects apply to dynamic objects which are recognized in the front and rear images. In this point, According to the eighth aspect, when a determination is made that the number of dynamic objects recognized in each of the right and left regions of the front image is equivalent to or greater than one and that a dynamic object is recognized in at least one of the right and left regions of the rear image, the bounding boxes are employed as the right and left recognition assistances. Consequently, it becomes possible to reduce occurrences of trouble that the operator makes a wrong recognition of left and right, with respect to the front of the moving body, by using the bounding boxes superimposed on the front and rear images.

According to the ninth aspect, even when the boundary which separates the right region from the left region has the predetermined shape, it becomes possible to apply the recognition assistance in a different color from the colors of both of the right and left recognition assistances.

According to the tenth aspect, the right and left recognition assistances superimposed on the moving body image are also superimposed on the infrastructure image. According to the tenth aspect, further, the color of the recognition assistance to be superimposed on the right region of the infrastructure image is a similar color to the color of the recognition assistance to be superimposed on the right region of the moving body image, and the color of the recognition assistance to be superimposed on the left region of the infrastructure image is a similar color to the color of the recognition assistance to be superimposed on the left region of the moving body image. Thus, this also helps the operator, who checks both of the moving body image and the infrastructure image, to make accurate decision, and contribution to safe movement of the moving body by the remote work is expected.

According to the eleventh aspect, the right front, left front, right rear, and left rear regions with respect to the front of the moving body are set in the infrastructure image, and the right front, left front, right rear, and left rear recognition assistances are superimposed respectively on those regions. Further, because the color of the right front recognition assistance is different from the color of the right rear recognition assistance and the color of the left front recognition assistance to be superimposed on the infrastructure image is different from the color of the left rear recognition assistance, it becomes possible to give information of the front-rear direction of the moving body to the infrastructure image. This helps the operator to make accurate decision, and contribution to safe movement of the moving body by the remote work is expected.

According to the twelfth aspect, the icon of the moving body and the right and left pictograms which surround the icon with respect to the front of the moving body are superimposed on the map image and are output from the display. The color of the right pictogram is a similar color to the color of the right recognition assistance to be superimposed on the moving body image. Meanwhile, the color of the left pictogram is a similar color to the color of the left recognition assistance to be superimposed on the moving body image. Consequently, it becomes possible for the operator to instantly recognize the front and rear of the moving body.

According to the thirteenth aspect, the right and left regions with respect to the front of the moving body are set in the infrastructure image generated based on data obtained from the infrastructure camera whose distance from the moving body is equivalent to or less than the predetermined value. According to the thirteenth aspect, further, the infrastructure image colored with different colors on right and left is output from the display. Consequently, it becomes possible to reduce occurrences of trouble that the operator makes a wrong recognition of left and right with respect to the front of the moving body in the infrastructure image.

DESCRIPTION OF EMBODIMENT

Figure 1:
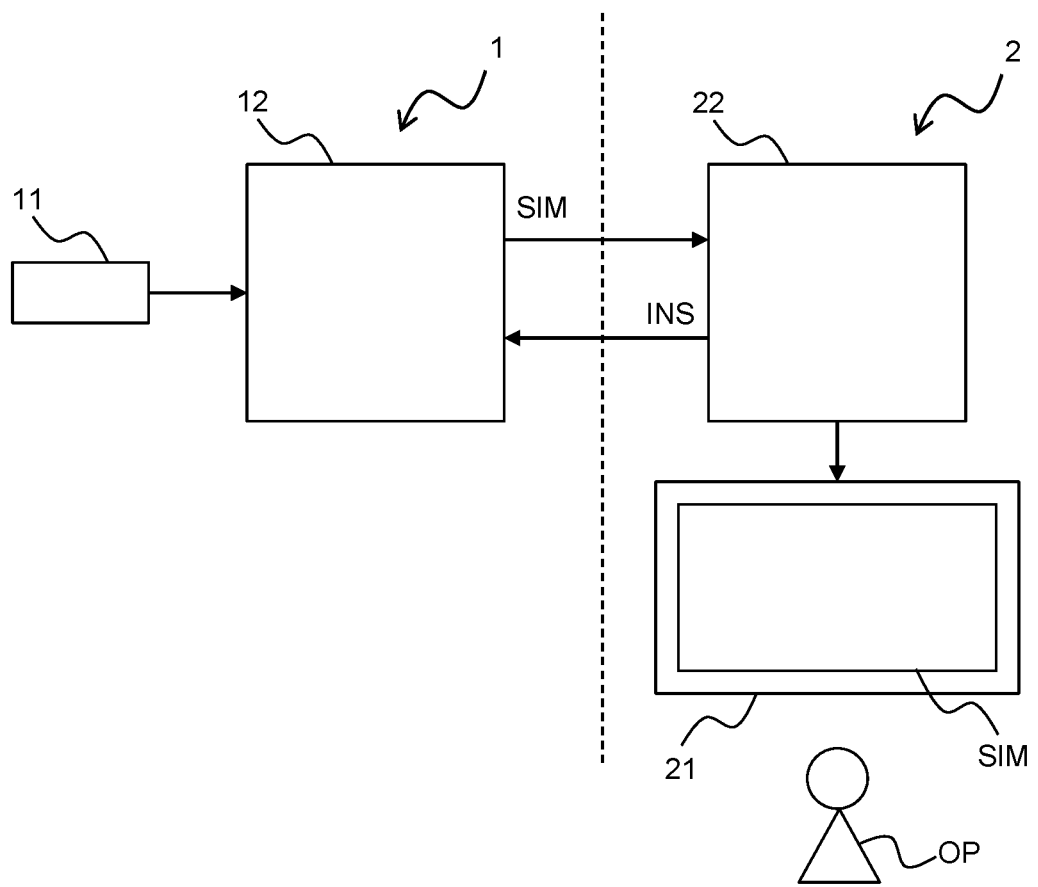
FIG. 1 is a diagram for explaining a presumed remote work in a first embodiment.

Display methods and display systems according to embodiments of the present disclosure will hereinafter be described with reference to drawings. Note that the display methods according to the embodiments are realized by computer processing to be performed in the display systems according to the embodiments. The same reference characters are given to the same or corresponding components in the drawings, and descriptions thereof will be simplified or will not be repeated.

First Embodiment

First, a first embodiment of the present disclosure will be described with reference to FIGS. 1 to 16.

1. Outline

1-1. Remote Work

FIG. 1 is a diagram for explaining a presumed remote work in the first embodiment. FIG. 1 illustrates a moving body 1 and a remote work device (hereinafter, also referred to as "terminal") 2. The moving body 1 is one example of a target which is subject to remote work by the terminal 2. As the moving body 1, a vehicle and robots such as a logistics robot and a working robot may be raised as examples.

As the remote work, remote driving for the purpose of operations directly related to behavior (such as running, stopping, and turning, for example) of the moving body 1 may be raised as an example. The remote work includes a remote command and a remote assistance. The remote command is performed for the purpose of an operation (such as turning a light on) which is not directly related to the behavior of the moving body 1. The remote assistance is performed for assisting recognition and decision by the moving body 1.

The moving body 1 communicates with the terminal 2 via a base station (not illustrated) of a network. For example, a data processing device 12 mounted on the moving body 1 determines whether or not the remote work is necessary. Then, when it is determined that the remote work is necessary, the data processing device 12 transmits a remote work request to the terminal 2. In transmission of the remote work request or previously to the transmission of this remote work request, the data processing device 12 transmits a sensor image SIM to the terminal 2. The sensor image SIM is generated based on data obtained from a sensor 11 mounted on the moving body 1. In the following, the sensor image SIM to be transmitted from the moving body 1 will also be referred to as "moving body image SIM_1".

A data processing device 22 of the terminal 2 responds to the remote work request and transmits various instructions INS to the moving body 1. As the instruction INS to be transmitted from the data processing device 22 to the moving body 1, an instruction based on decision by an operator OP may be raised as an example. For example, the operator OP views the sensor image SIM (moving body image SIM_1) output from a display 21 of the terminal 2 and understands contents of the remote work request. Then, the operator OP makes decision about an action to be performed by the moving body 1 and inputs a command corresponding to this action to the terminal 2. As actions to be performed by the moving body 1, travel, stop, offset avoidance from an obstacle in front, emergency evacuation, and so forth may be raised as examples. The data processing device 22 generates the instruction INS corresponding to input data from the operator OP and transmits the instruction INS to the moving body 1.

Figure 2:
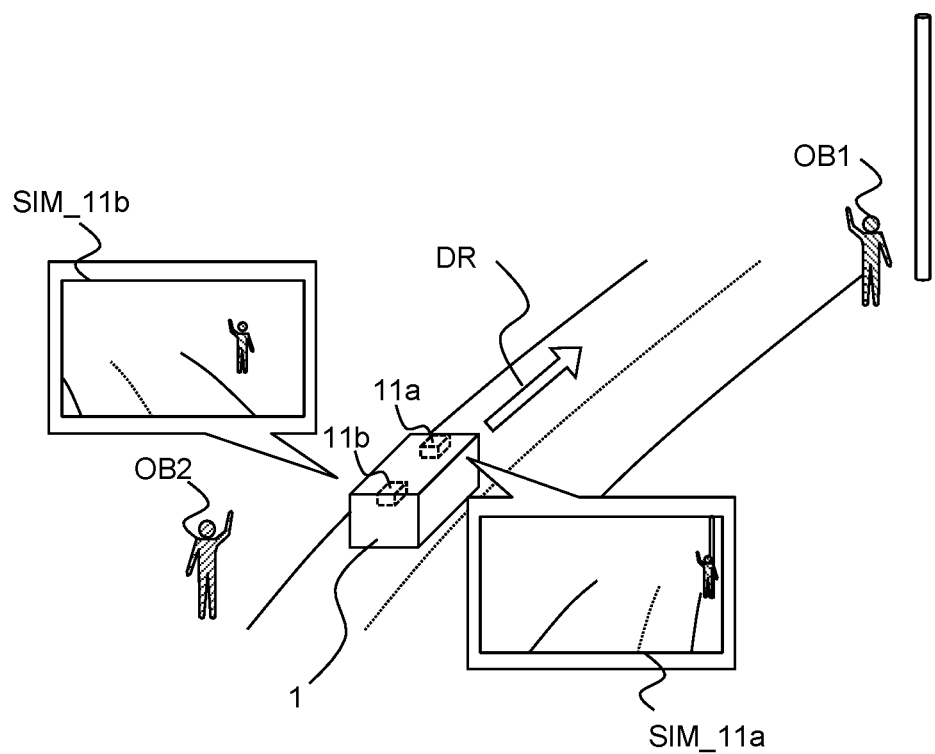
FIG. 2 is a diagram for explaining an example of a moving body image.

FIG. 2 is a diagram for explaining an example of the moving body image SIM_1. FIG. 2 illustrates a vehicle as the moving body 1 and sensors 11a and 11b which are mounted on the vehicle. A direction DR of an arrow indicated in FIG. 2 represents a traveling direction of the moving body 1. The sensor 11a is the sensor 11 which detects a situation in front of the moving body 1, and the sensor 11b is the sensor 11 which detects a situation in the rear of the moving body 1. The sensors 11a and 11b are typically cameras, but the moving body image SIM_1 can also be generated based on data obtained from laser imaging, detection, and ranging (LiDAR). Consequently, the sensors 11a and 11b may be LiDAR.

A front image SIM_11a illustrated in FIG. 2 is one example of the moving body image SIM_1 generated based on data obtained from the sensor 11a. The front image SIM_11a includes an image of a dynamic object OB1 (pedestrian) which is present on a road shoulder (sidewalk) in right front of the moving body 1. Meanwhile, a rear image SIM_11b is one example of the moving body image SIM_1 generated based on data obtained from the sensor 11b. The rear image SIM_11b includes an image of a dynamic object OB2 (pedestrian) which is present on a road shoulder (sidewalk) in left rear of the moving body 1.

1-2. Problems in Remote Work

Figure 3:
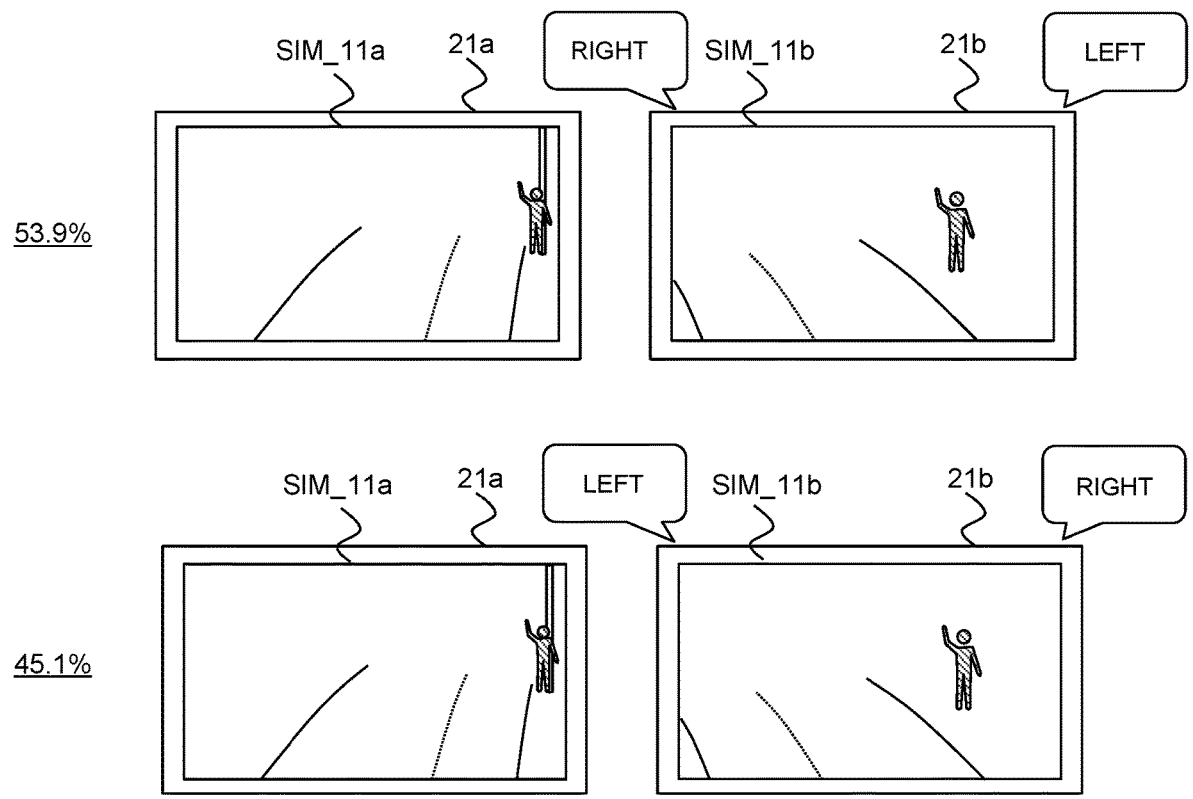
FIG. 3 is a diagram for explaining problems in a remote work.

FIG. 3 is a diagram for explaining problems in the remote work. FIG. 3 illustrates combinations of two kinds of moving body images SIM_1 described with reference to FIG. 2 respectively in an upper stage and a lower stage. The front image SIM_11a is output to a display 21a, and the rear image SIM_11b is output to a display 21b.

The operator OP who views the front image SIM_11a output to the display 21a can easily decide in which of right front or left front of the moving body 1 the dynamic object OB1 is present. However, the operator OP who views the rear image SIM_11b output to the display 21b possibly makes wrong decision about in which of right rear or left rear of the moving body 1 the dynamic object OB2 is present.

The reason is because it has become clear from a psychological experiment that an individual difference is present about whether, when a subject views his/her figure reflected by a mirror, the subject recognizes that the figure is the figure in which left and right are reversed or that nothing is reversed (Y. Takano et al., "Mirror reversal: Empirical tests of competing accounts", Quarterly Journal of Experimental Psychology Society, 2007, 60(11), 1555-1584). In this psychological experiment, results are reported that 53.9% of all subjects answered that left and right of the figure reflected by the mirror were reversed and 45.1% of all of the subjects answered that nothing was reversed.

In other words, those results suggest that 53.9% of operators OP who view the rear image SIM_11b possibly recognize that left and right of the rear image SIM_11b are reversed from left and right of the front image SIM_11a and 45.1% of the operators OP possibly recognize that this reversal does not occur. Presence of such an individual difference obstructs accomplishment of safe remote work. Further, hypothetically, when the operator OP misunderstands the front image SIM_11a as the rear image SIM_11b, the operator OP highly possibly makes a wrong recognition of left and right with respect to the front of the moving body 1 in the moving body image SIM_1.

1-3. Recognition Assistance

Taking into consideration such a problem, in the first embodiment, the display 21 outputs the moving body image SIM_1 on which "recognition assistance" is superimposed. In the recognition assistance which is superimposed on the moving body image SIM_1, left and right with respect to the front of the moving body 1 are colored with different colors. Specifically, the recognition assistance superimposed on a left region of the front image SIM_11a is colored with a similar color to the recognition assistance superimposed on a left region of the rear image SIM_11b, and the recognition assistance superimposed on a right region of the front image SIM_11a is colored with a similar color to the recognition assistance superimposed on a right region of the rear image SIM_11b.

Here, the right and left regions are specified by setting a boundary extending in a front-rear direction of the moving body 1. A setting procedure of the right and left regions will be described later. A similar color denotes a combination of colors whose brightness or saturation is different but hue is the same, a combination of colors whose brightness and saturation are different (tones are different) but hue is the same, or a combination of colors whose brightness and saturation are the same (tones are the same) but which have neighboring hues (adjacent colors). In the following, examples of the recognition assistance will be described.

1-3-1. First Example

Figure 4:
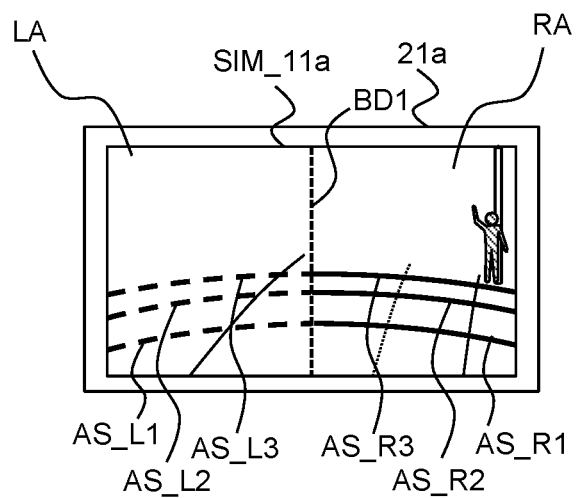
FIG. 4 is a diagram for illustrating a first example of a recognition assistance.
Figure 4:
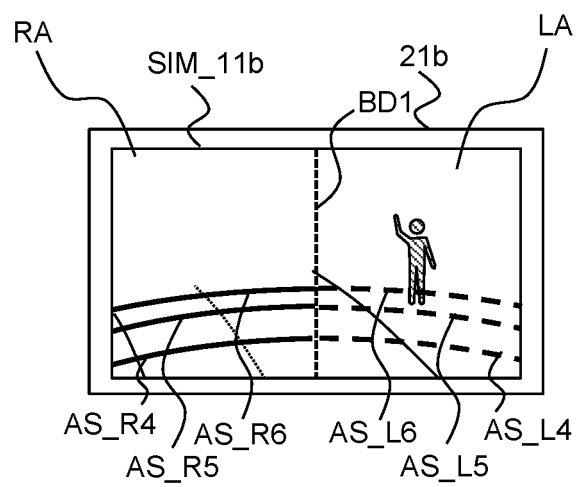

FIG. 4 is a diagram illustrating a first example of the recognition assistance. FIG. 4 illustrates two kinds of moving body images SIM_1 respectively in an upper stage and a lower stage. The front image SIM_11a is output to the display 21a, and the rear image SIM_11b is output to the display 21b. To this point, the example is provided in the same manner as the description about FIG. 3.

Each of the front image SIM_11a and the rear image SIM_11b is demarcated by a boundary BD1 into a left region LA and a right region RA. Note that the boundary BD1 is indicated in FIG. 4 for convenience of description, and the boundary BD1 is not superimposed on the front image SIM_11a or the rear image SIM_11b. The left region LA and the right region RA are specified by using the boundary BD1, and a setting procedure of those regions will be described later.

In the first example, recognition assistances AS_R1 to AS_R3 in circular arc shapes are superimposed on the right region RA of the front image SIM_11a, and recognition assistances AS_R4 to AS_R6 in circular arc shapes are also superimposed on the right region RA of the rear image SIM_11b. Those circular arcs are parts of concentric circumferences around a reference point (a center position of a rear wheel shaft of the vehicle, an installation position of the sensor 11a or 11b, or a position of a driver seat, for example) of the moving body 1 and which are drawn on a virtual horizontal plane. For example, the recognition assistance AS_R1 and the recognition assistance AS_R4 constitute the same circle, the recognition assistance AS_R2 and the recognition assistance AS_R5 constitute the same circle, and the recognition assistance AS_R3 and the recognition assistance AS_R6 constitute the same circle.

Similar colors are used for colors of the recognition assistances AS_R1 to AS_R6, but colors can be caused to agree with each other for each of the recognition assistances constituting the same circles. For example, the same color can be used for the color of the recognition assistance AS_R1 and the color of the recognition assistance AS_R4, the same color can be used for the color of the recognition assistance AS_R2 and the color of the recognition assistance AS_R5, and the same color can be used for the color of the recognition assistance AS_R3 and the color of the recognition assistance AS_R6. Further, in this case, a color arrangement technique (gradation) may be used which regularly changes at least one of brightness and saturation of the recognition assistances in accordance with the distance from the reference point of the moving body 1.

Further, in the first example, recognition assistances AS_L1 to AS_L3 in circular arc shapes are superimposed on the left region LA of the front image SIM_11a, and recognition assistances AS_L4 to AS_L6 in circular arc shapes are also superimposed on the left region LA of the rear image SIM_11b. The description about the recognition assistances AS_L1 to AS_L6 is basically the same as the description about the recognition assistances AS_R1 to AS_R6. However, the recognition assistances AS_L1 to AS_L6 are colored with dissimilar colors (different colors) from the recognition assistances AS_R1 to AS_R6.

1-3-2. Second Example

Figure 5:
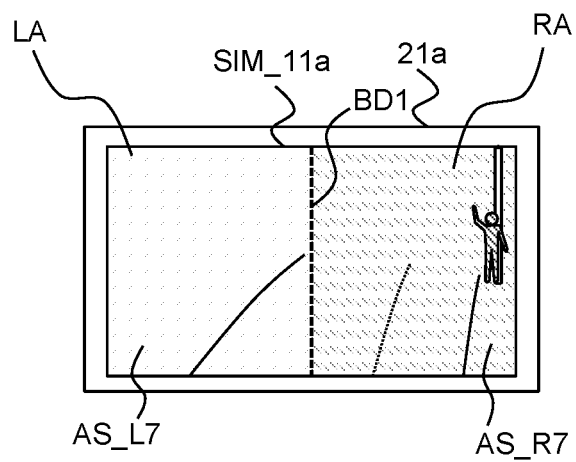
FIG. 5 is a diagram for illustrating a second example of a recognition assistance.
Figure 5:
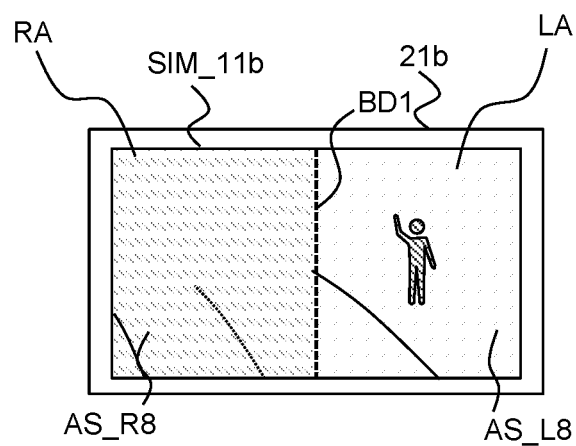

FIG. 5 is a diagram illustrating a second example of the recognition assistance. FIG. 5 illustrates two kinds of moving body images SIM_1 respectively in an upper stage and a lower stage. Note that an output form of the front image SIM_11a and the rear image SIM_11b and demarcation by the boundary BD1 into the left region LA and the right region RA in FIG. 5 are common to the first example.

In the second example, a recognition assistance AS_R7 is superimposed which covers the whole right region RA of the front image SIM_11a, and a recognition assistance AS_R8 is superimposed which covers the whole right region RA of the rear image SIM_11b. A region covered by the recognition assistance AS_R7 may be a part of the right region RA of the front image SIM_11a, and a region covered by the recognition assistance AS_R8 may be a part of the right region RA of the rear image SIM_11b. In this case, shapes of the recognition assistance AS_R7 and the recognition assistance AS_R8 are not particularly limited and may be circular shapes, elliptical shapes, polygonal shapes, star-like polygonal shapes or may be straight lines (such as a solid line, a broken line, and a one-dot chain line). Similar colors are used for colors of the recognition assistance AS_R7 and the recognition assistance AS_R8.

Further, in the second example, a recognition assistance AS_L7 is superimposed which covers the whole left region LA of the front image SIM_11a, and a recognition assistance AS_L8 is superimposed which covers the whole left region LA of the rear image SIM_11b. The description about the recognition assistances AS_L7 and AS_L8 is basically the same as the description about the recognition assistances AS_R7 and AS_R8. However, the recognition assistances AS_L7 and AS_L8 are colored with dissimilar colors from the recognition assistances AS_R7 and AS_R8.

1-3-3. Third Example

Figure 6:
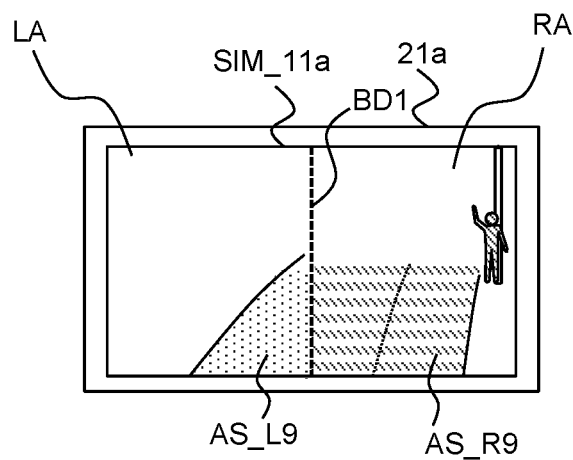
FIG. 6 is a diagram for illustrating a third example of a recognition assistance.
Figure 6:
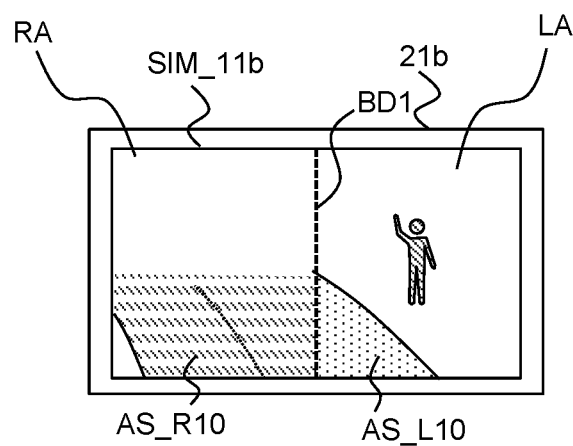

FIG. 6 is a diagram illustrating a third example of the recognition assistance. FIG. 6 illustrates two kinds of moving body images SIM_1 respectively in an upper stage and a lower stage. Note that an output form of the front image SIM_11a and the rear image SIM_11b and demarcation by the boundary BD1 into the left region LA and the right region RA in FIG. 6 are common to the first example.

In the third example, a recognition assistance AS_R9 is superimposed which covers a lane recognized in the right region RA of the front image SIM_11a, and a recognition assistance AS_R10 is superimposed which covers a lane recognized in the right region RA of the rear image SIM_11b. Those lanes are examples of static objects included in the front image SIM_11a. Recognition of a static object is performed by a known procedure such as machine learning, for example. As other examples of the static object, a guardrails, road structures (traffic signals and traffic signs), and so forth may be raised. Similar colors are used for colors of the recognition assistance AS_R9 and the recognition assistance AS_R10.

In the third example, a recognition assistance AS_L9 is superimposed which covers a lane recognized in the left region LA of the front image SIM_11a, and a recognition assistance AS_L10 is superimposed which covers a lane recognized in the left region LA of the rear image SIM_11b. The description about the recognition assistances AS_L9 and AS_L10 is basically the same as the description about the recognition assistances AS_R9 and AS_R10. However, the recognition assistances AS_L9 and AS_L10 are colored with dissimilar colors from the recognition assistances AS_R9 and AS_R10.

1-3-4. Fourth Example

Figure 7:
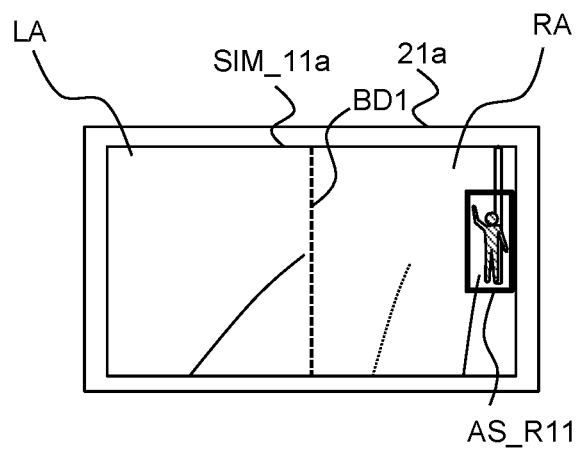
FIG. 7 is a diagram for illustrating a fourth example of a recognition assistance.
Figure 7:
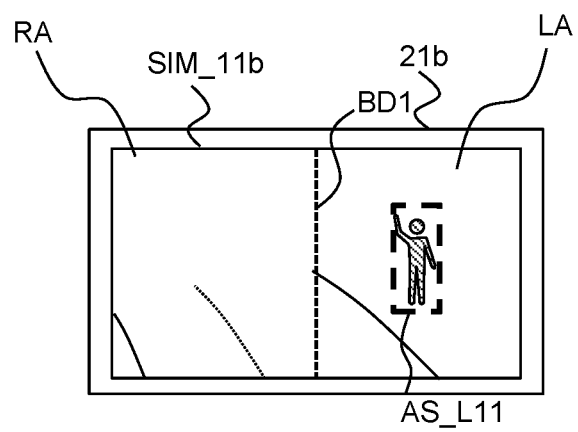

FIG. 7 is a diagram illustrating a fourth example of the recognition assistance. FIG. 7 illustrates two kinds of moving body images SIM_1 respectively in an upper stage and a lower stage. Note that an output form of the front image SIM_11a and the rear image SIM_11b and demarcation by the boundary BD1 into the left region LA and the right region RA in FIG. 7 are common to the first example.

In the fourth example, a recognition assistance AS_R11 (bounding box) is superimposed which surrounds the dynamic object OB1 recognized in the right region RA of the front image SIM_11a. Further, in the fourth example, a recognition assistance AS_L11 (bounding box) is superimposed which surrounds the dynamic object OB2 recognized in the left region LA of the rear image SIM_11b. Recognition of a dynamic object is performed by a known procedure such as machine learning, for example. As examples of the dynamic object, in addition to pedestrians illustrated in FIG. 7, a bicycle, a motorcycle, and an automobile may be raised.

The recognition assistance AS_L11 is colored with a dissimilar color from the recognition assistance AS_R11. Hypothetically, when the dynamic object OB2 is recognized in the right region RA of the rear image SIM_11b, the recognition assistance AS_L11 is colored with a similar color to the recognition assistance AS_R11.

1-3-5. Fifth Example

Figure 8:
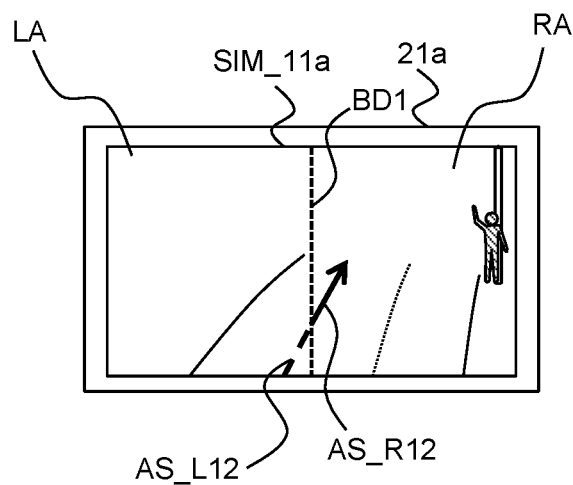
FIG. 8 is a diagram for illustrating a fifth example of a recognition assistance.
Figure 8:
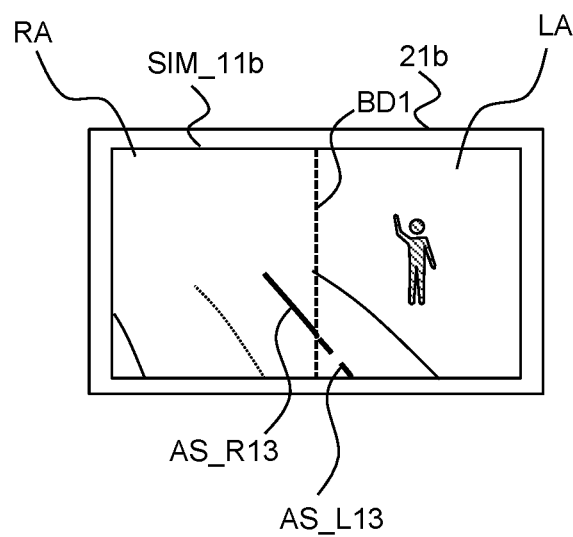

FIG. 8 is a diagram illustrating a fifth example of the recognition assistance. FIG. 8 illustrates two kinds of moving body images SIM_1 respectively in an upper stage and a lower stage. Note that an output form of the front image SIM_11a and the rear image SIM_11b and demarcation by the boundary BD1 into the left region LA and the right region RA in FIG. 8 are common to the first example.

In the fifth example, a track of the moving body 1 is superimposed on the front image SIM_11a and the rear image SIM_11b. The track of the moving body 1 which is superimposed on the front image SIM_11a is specifically a future track of the moving body 1 when the present time point is set as a reference and is generated based on vehicle control data including at least one of driving, braking, and steering of the moving body 1, for example. The track of the moving body 1 which is superimposed on the rear image SIM_11b is a past track of the moving body 1 when the present time point is set as the reference and is generated based on history data of lateral positions of the moving body 1 with respect to a reference position which is set on a lane, for example.

In the fifth example, a recognition assistance AS_R12 is superimposed on the track of the moving body 1 which is included in the right region RA of the front image SIM_11a, and a recognition assistance AS_L12 is superimposed on the track of the moving body 1 which is included in the left region LA of the front image SIM_11a. The recognition assistance AS_L12 is colored with a dissimilar color from the recognition assistance AS_R12.

Further, in the fifth example, a recognition assistance AS_R13 is superimposed on the track of the moving body 1 which is included in the right region RA of the rear image SIM_11b, and a recognition assistance AS_L13 is superimposed on the track of the moving body 1 which is included in the left region LA of the rear image SIM_11b. The recognition assistance AS_L13 is colored with a dissimilar color from the recognition assistance AS_R13.

As the color of the recognition assistance AS_L13, a similar color to the color of the recognition assistance AS_L12 can be used, and the same color can also be used. As the color of the recognition assistance AS_R13, a similar color to the color of the recognition assistance AS_R12 can be used, and the same color can also be used.

A concept of the fifth example can also be applied to a track of a dynamic object recognized in the moving body image SIM_1. In this case, for example, the dynamic object included in the moving body image SIM_1 is recognized by a known procedure such as machine learning, and a past track of the dynamic object is thereby specified. Further, the past track is drawn on the moving body image SIM_1, and the recognition assistance may be superimposed along the past track. In addition, a future track of the dynamic object may be predicted from the specified past track. In this case, the future track of the dynamic object may be drawn on the moving body image SIM_1, and the recognition assistance may be superimposed along the future track.

1-3-6. Sixth Example

Figure 9:
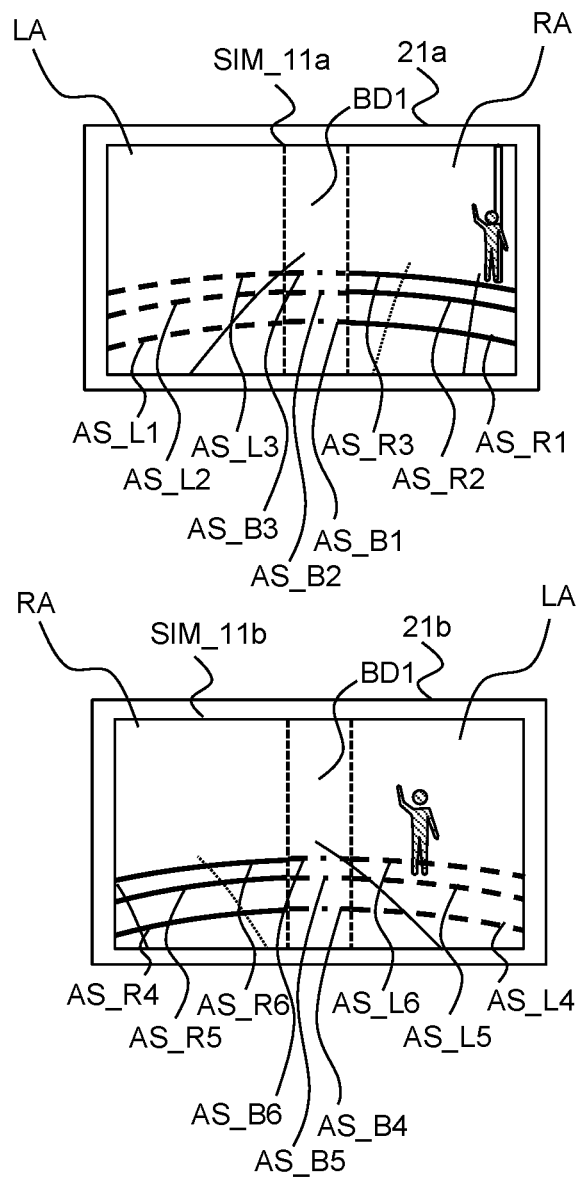
FIG. 9 is a diagram for illustrating a sixth example of a recognition assistance.

FIG. 9 is a diagram illustrating a sixth example of the recognition assistance. FIG. 9 illustrates two kinds of moving body images SIM_1 respectively in an upper stage and a lower stage. An output form of the front image SIM_11a and the rear image SIM_11b in FIG. 9 is common to the first example.

Differently from the first to fifth examples, in the sixth example, the boundary BD1 exhibits a region shape which has a certain width in a left-right direction. In the sixth example, recognition assistances AS_B1 to AS_B3 in circular arc shapes are superimposed on the boundary BD1 of the front image SIM_11a, and recognition assistances AS_B4 to AS_B6 in circular arc shapes are superimposed on the boundary BD1 of the rear image SIM_11b. The recognition assistance AS_B1 is positioned between the recognition assistance AS_R1 and the recognition assistance AS_L1. The recognition assistances AS_B2 to AS_B6 are respectively positioned between recognition assistances AS_Lk and recognition assistances AS_Lk (k=2 to 6).

The description about the recognition assistances AS_B1 to AS_B6 is basically the same as the description about the recognition assistances AS_R1 to AS_R6. However, the recognition assistances AS_B1 to AS_B6 are colored with a color which is dissimilar both from the recognition assistances AS_R1 to AS_R6 and from the recognition assistances AS_L1 to AS_L6 (in other words, a third color).

In the sixth example, the position of the boundary BD1 may be moved in the left-right direction. For example, when the position of the driver seat of the moving body 1 is set as the reference point of the moving body 1, the position of the boundary BD1 is moved. This modification may similarly be applied to the first to fifth examples.

Further, in the sixth example, the shape of the boundary BD1 may arbitrarily be changed. As other shapes of the boundary BD1, shapes such as a triangular shape and a trapezoidal shape may be raised. For example, when an apex is set to the reference point of the moving body 1 and the remaining two apexes of a triangle are respectively set to peripheral edges of the front image SIM_11a and the rear image SIM_11b, a triangular boundary BD1 can be set on those images. Further, the width of the boundary BD1 in the left-right direction is gradually changed from the front toward the rear of the moving body 1, and a trapezoidal boundary BD1 can thereby be set on those images.

As described above, in the first embodiment, the recognition assistances which are colored with different colors on left and right are superimposed on the moving body image SIM_1, the left and right being defined with the front of the moving body 1 being set as the reference, and the moving body image SIM_1 with the recognition assistances is output from the display 21. Consequently, it becomes possible to reduce occurrences of trouble that the operator OP makes a wrong recognition of left and right with respect to the front of the moving body 1 in the moving body image SIM_1.

2. System Configuration Example

Next, a configuration example of a display system according to the first embodiment will be described.

2-1. General Configuration Example

Figure 10:
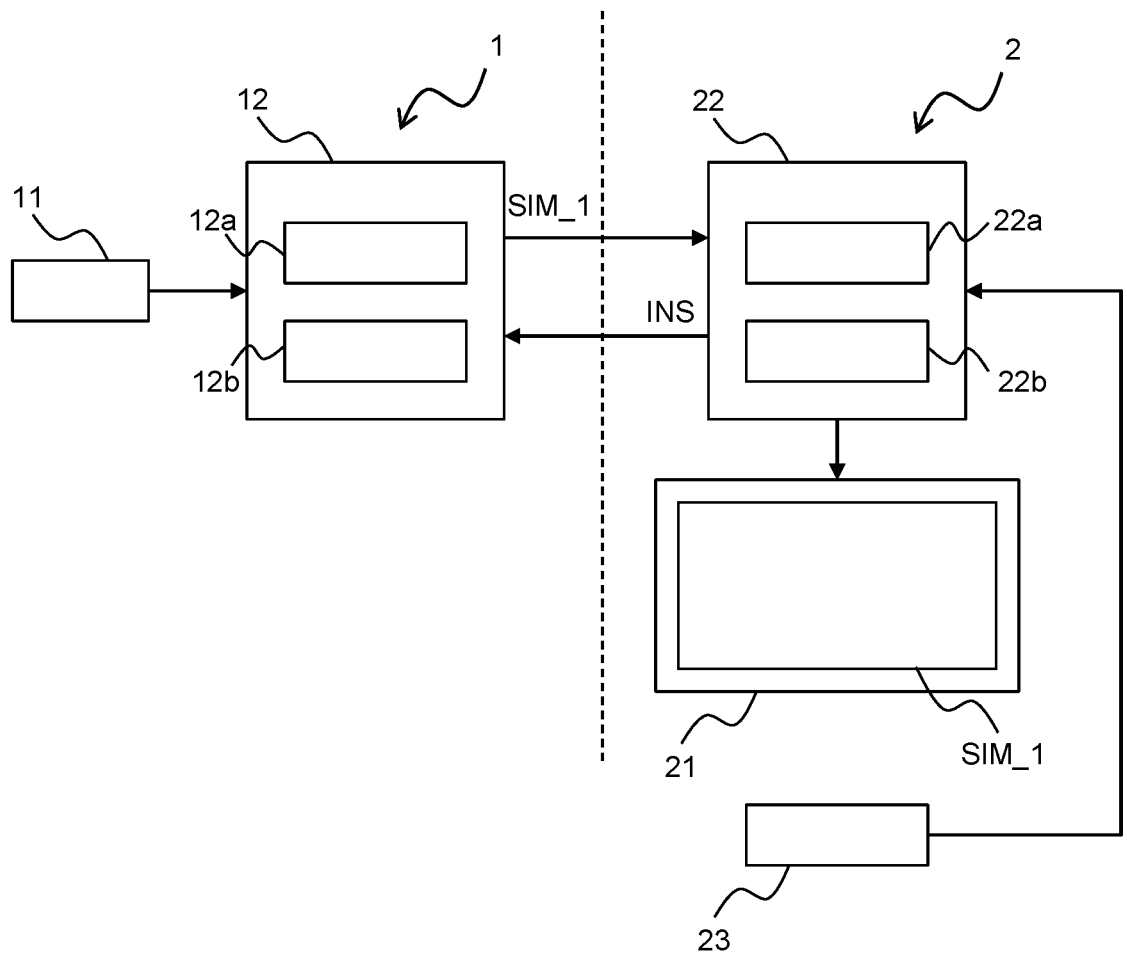
FIG. 10 is a block diagram illustrating the configuration example of the display system according to the first embodiment.

FIG. 10 is a block diagram illustrating the configuration example of the display system according to the first embodiment. In the example illustrated in FIG. 10, as a configuration of the display system according to the first embodiment, the moving body 1 and the terminal 2 are illustrated, the moving body 1 including the sensor 11 and the data processing device 12, the terminal 2 including the display 21, the data processing device 22, and an input device 23.

The sensor 11 is mounted on the moving body 1. The sensor 11 detects at least situations in the front and rear of the moving body 1. As the sensor 11, a camera and LIDAR may be raised as examples. As the specific sensor 11, the sensors 11a and 11b illustrated in FIG. 2 are raised. However, the sensor 11a may include three sensors which detect situations in a front center, right front, and left front of the moving body 1. Further, the sensor 11b may include three sensors which detect situations in a rear center, right rear, and left rear of the moving body 1.

In addition, the sensor 11 may include sensors which detect situations on a right side and a left side of the moving body 1. Note that the sensor which detects the situation on the right side (or left side) of the moving body 1 may together detect the situation on the right rear (or left rear) of the moving body 1.

The data processing device 12 is a microcomputer mounted on the moving body 1. The data processing device 12 includes at least one processor 12a and at least one memory 12b. The processor 12a includes a central processing unit (CPU). The memory 12b is a volatile memory such as a DDR memory, expands various programs to be used by the processor 12a, and temporarily saves various kinds of data. The memory 12b stores various kinds of data obtained from the sensor 11, the moving body image SIM_1 to be transmitted to the terminal 2 by the moving body 1, and the instruction INS to be received from the terminal 2 by the moving body 1.

The processor 12a executes a program for image processing, which is stored in the memory 12b, and thereby performs various processes related to generation of the moving body image SIM_1. Further, the processor 12a executes a program for image transmission, which is stored in the memory 12b, and thereby performs various processes for transmitting the generated moving body image SIM_1 to the terminal 2. Furthermore, the processor 12a executes a program for the remote work, which is stored in the memory 12b, and thereby performs various processes related to control of the moving body 1 based on the instruction INS received from the terminal 2.

The display 21 is a display device to which the moving body image SIM_1 is output. The display 21 is installed in a facility of a business operator which provides remote work services of the moving body 1, for example. The display 21 and the data processing device 22 are connected together in a wired or wireless manner. In the latter case, the display 21 may be connected with the data processing device 22 via a base station of a network. The total number of displays 21 is not particularly limited, but it is desirable that at least images in the front and rear of the moving body 1 (for example, the front image SIM_11a and the rear image SIM_11b) be separately output. Thus, it is desirable that the total number of displays be at least two.

The data processing device 22 is a computer for performing the remote work of the moving body 1. The data processing device 22 includes at least one processor 22a and at least one memory 22b. The processor 22a includes a central processing unit (CPU). The memory 22b is a volatile memory such as a DDR memory, expands various programs to be used by the processor 22a, and temporarily saves various kinds of data. The memory 22b stores the moving body image SIM_1 to be received from the moving body 1 by the terminal 2, various kinds of data from the input device 23, and the instruction INS to be transmitted to the moving body 1 by the terminal 2.

The processor 22a executes a program for an output process, which is stored in the memory 22b, and thereby performs various processes related to output control of the moving body image SIM_1. Further, the processor 22a executes a program for the remote work, which is stored in the memory 22b, and thereby performs various processes for generating the instruction INS to be transmitted to the moving body 1. In addition, the processor 22a executes a program for instruction transmission and thereby performs various processes for transmitting the generated instruction INS to the moving body 1.

The input device 23 is operated by the operator OP. The input device 23 includes an input unit which is operated by the operator OP and a control circuit which generates and outputs a signal based on input data, for example. As input units, a mouse, a keyboard, a button, and a switch may be raised as examples. As other examples of the input units, a steering wheel, a shift lever, an accelerator pedal, and a brake pedal may be raised. As signals generated based on operation inputs, a signal for changing (such as enlarging and shrinking) display forms of the moving body image SIM_1 on the display 21, a signal corresponding to an action to be performed by the moving body 1, and so forth may be raised as examples.

2-2. Function Configuration Example

2-2-1. Function Configuration Example of Data Processing Device 12

Figure 11:
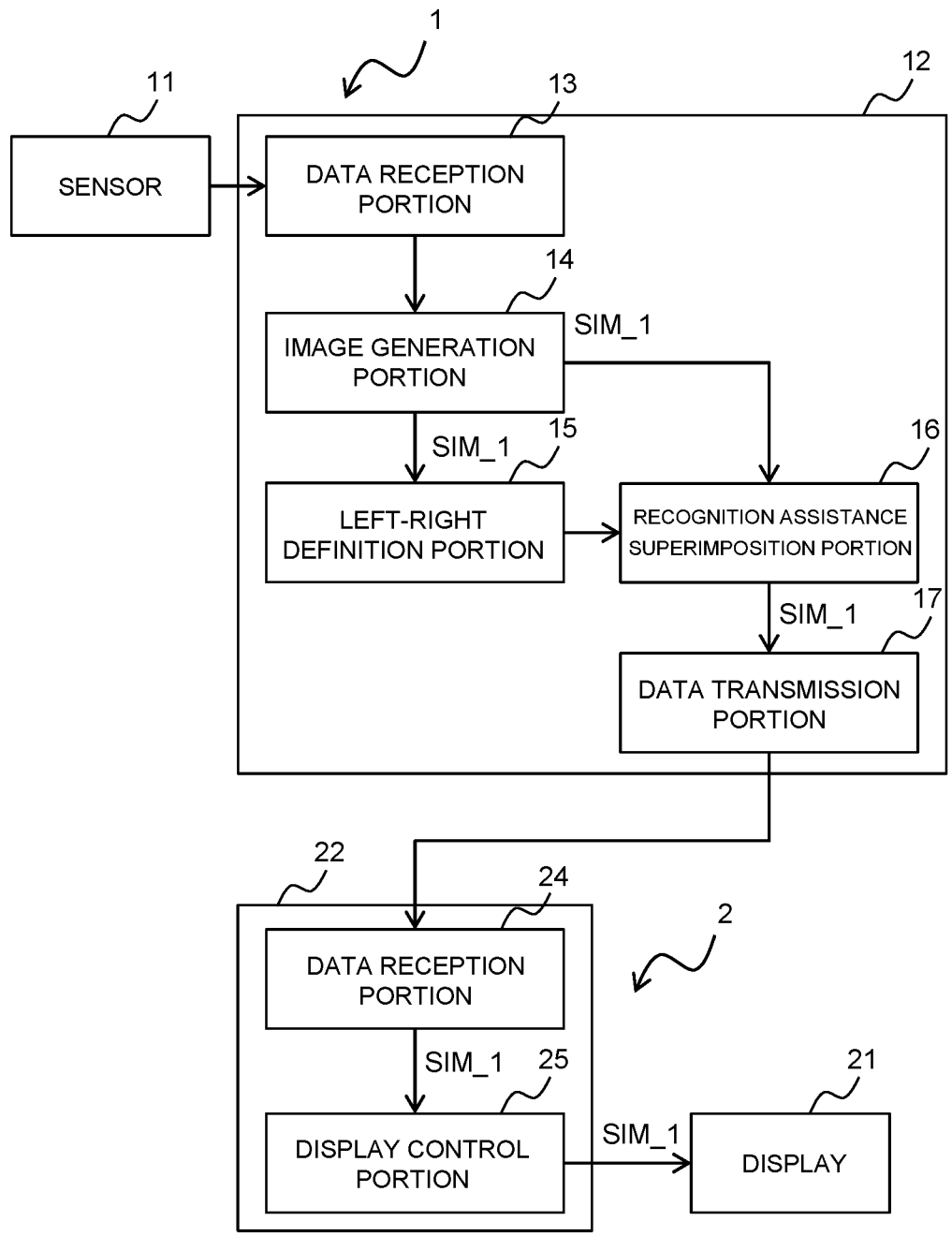
FIG. 11 is a block diagram illustrating a configuration example of functions which are particularly related to the first embodiment.

FIG. 11 is a block diagram illustrating a configuration example of functions which are particularly related to the first embodiment. In the example illustrated in FIG. 11, the data processing device 12 includes a data reception portion 13, an image generation portion 14, a left-right definition portion 15, a recognition assistance superimposition portion 16, and a data transmission portion 17. Functions of blocks illustrated in the data processing device 12 are realized by execution of various programs by the processor 12a. Note that a part of the functions (for example, the image generation portion 14, the left-right definition portion 15, and the recognition assistance superimposition portion 16) of the data processing device 12 may be realized by program processing by an external server of the moving body 1.

The data reception portion 13 receives various kinds of data detected by the sensor 11. The various kinds of data include data indicating the situation in the front of the moving body 1 and data indicating the situation in the rear of the moving body 1. The data indicating the situation in the front may include data indicating the situations in the front center, right front, and left front of the moving body 1. The data indicating the situation in the rear may include data indicating the situations in the rear center, right rear, and left rear of the moving body 1. Various kinds of data obtained by the sensor 11 may include data indicating the situations on the right side and the left side of the moving body 1. The data reception portion 13 transmits various kinds of data to the image generation portion 14.

The image generation portion 14 generates the sensor image SIM (moving body image SIM_1) based on various kinds of data received from the data reception portion 13. When the sensor 11 is a camera, the image generation portion 14 generates the moving body image SIM_1 based on a color image detected by the camera. When the sensor 11 is LIDAR, the image generation portion 14 generates the moving body image SIM_1 based on point group data detected by the LIDAR. The image generation portion 14 transmits the generated moving body image SIM_1 to the left-right definition portion 15 and the recognition assistance superimposition portion 16.

Figure 12:
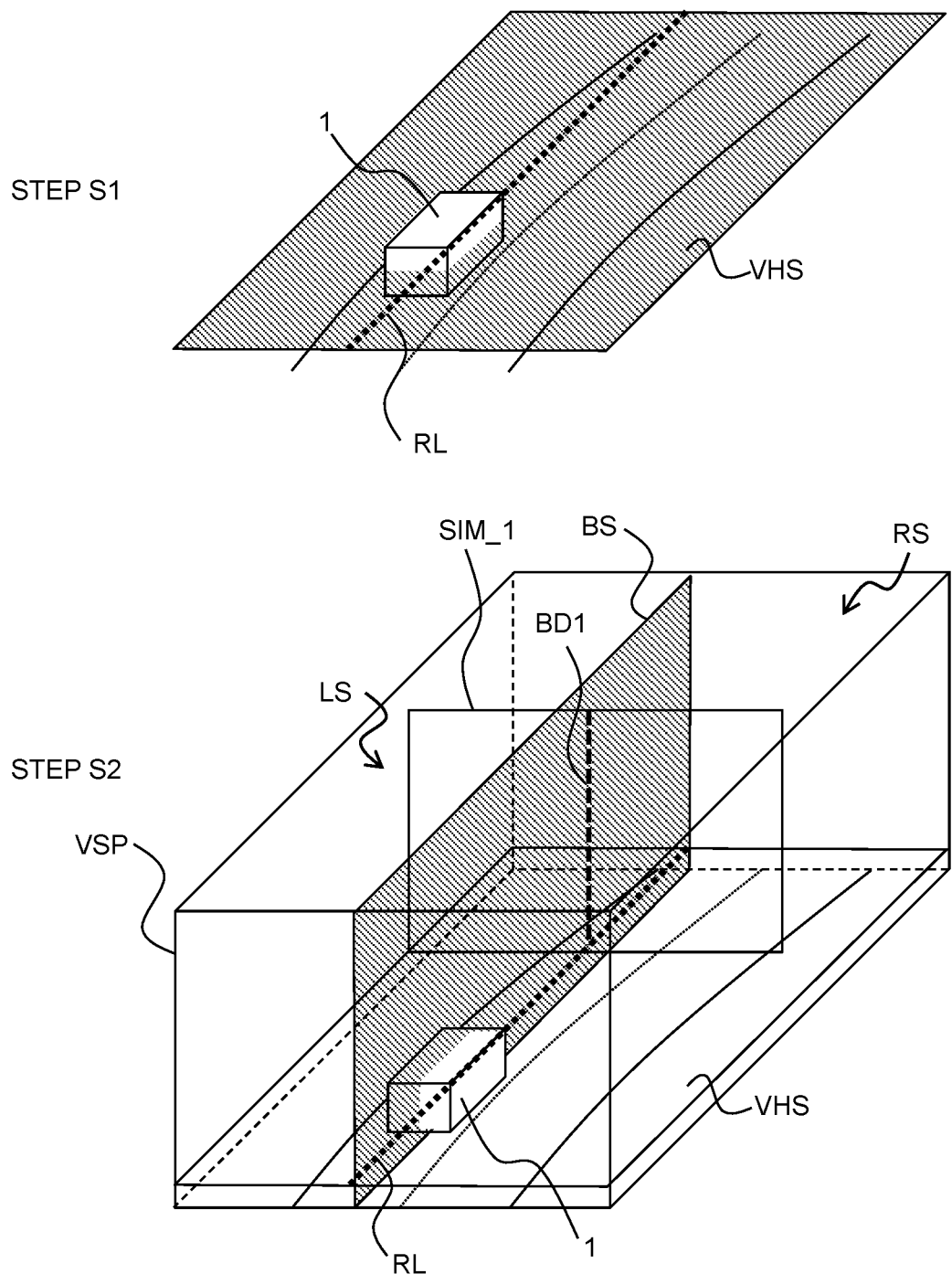
FIG. 12 is a diagram for explaining a processing example by a left-right definition portion.

The left-right definition portion 15 defines left and right in the moving body image SIM_1. The left-right definition portion 15 first sets a boundary. FIG. 12 is a diagram for explaining a processing example by the left-right definition portion 15. Note that in FIG. 12, the processing example will be described on the presumption that the moving body 1 is a vehicle. In the example illustrated in FIG. 12, a virtual horizontal plane VHS is first set which passes through the reference point (for example, a center position of a rear wheel shaft of the vehicle) of the moving body 1 (step S1). The virtual horizontal plane VHS is a plane parallel with a lane on which the moving body 1 runs, for example.

After the virtual horizontal plane VHS is set, a reference line RL extending in a front-rear direction of the moving body 1 is set on the virtual horizontal plane VHS (step S1). The front-rear direction is a direction in which a center of vehicle-body front of the moving body 1 is connected with a center of vehicle-body rear, for example. In the example illustrated in FIG. 12, the reference line RL is set by projecting a straight line passing through those centers onto the virtual horizontal plane VHS.

After the reference line RL is set, a plane (hereinafter, also referred to as "boundary plane BS") is set which includes the reference line RL and is orthogonal to the virtual horizontal plane VHS (step S2). After the boundary plane BS is set, in a virtual space VSP including the boundary plane BS and the virtual horizontal plane VHS, a right space RS and a left space LS with respect to the front of the moving body 1 can be defined.

The left-right definition portion 15 applies the virtual space VSP, which includes the boundary plane BS and the virtual horizontal plane VHS, to the moving body image SIM_1 (step S2). Accordingly, the boundary BD1 can be set which is drawn by the boundary plane BS on the moving body image SIM_1. After the boundary BD1 is set, the right region RA and the left region LA with respect to the front of the moving body 1 can be set on the moving body image SIM_1.

The left-right definition portion 15 transmits data of the right region RA and the left region LA in the moving body image SIM_1 to the recognition assistance superimposition portion 16. The left-right definition portion 15 transmits data of pixel coordinates, which constitute the boundary BD1 in the moving body image SIM_1, to the recognition assistance superimposition portion 16, for example. When the recognition assistances in the circular arc shapes are superimposed on the moving body image SIM_1 (in other words, a case of the first example described with reference to FIG. 4), the left-right definition portion 15 transmits data of pixel coordinates, which constitute the virtual horizontal plane VHS in the moving body image SIM_1, to the recognition assistance superimposition portion 16.

The recognition assistance superimposition portion 16 superimposes the recognition assistance on the moving body image SIM_1 based on the moving body image SIM_1 received from the image generation portion 14 and various kinds of data which are received from the left-right definition portion 15 and are related to the moving body image SIM_1.

In a case of the first example described with reference to FIG. 4, the recognition assistance superimposition portion 16 uses the data of the pixel coordinates, which constitute the virtual horizontal plane VHS in the moving body image SIM_1, and thereby draws virtual concentric circles, around the reference point of the moving body 1, on the virtual horizontal plane VHS. Next, the recognition assistance superimposition portion 16 applies the virtual concentric circles to the moving body image SIM_1, superimposes the recognition assistances AS_R1 to AS_R6 on the right region RA, and superimposes the recognition assistances AS_L1 to AS_L6 on the left region LA.

In a case of the second example described with reference to FIG. 5, the recognition assistance superimposition portion 16 superimposes the recognition assistances AS_R7 and AS_R8 which cover the whole right regions RA and superimposes the recognition assistances AS_L7 and AS_L8 on the left regions LA. Note that in order to inhibit visibility of the moving body image SIM_1 from being lowered by the recognition assistances to be superimposed, it is desirable to color the right region RA and the left region LA by using transparent colors in a case of the second example. In the other examples, when coloring is performed with a color which is not a transparent color, it is desirable to change a transparency value of this color in accordance with time.

In a case of the third example described with reference to FIG. 6, the recognition assistance superimposition portion 16 first recognizes objects included in the moving body image SIM_1. When a static object included in the moving body image SIM_1 is recognized, the recognition assistance superimposition portion 16 superimposes the recognition assistance AS_R9, AS_R10, AS_L9, or AS_L10, which covers the pixel coordinates constituting the static object, in accordance with the region in which the static object is recognized. Note that in order to inhibit visibility of the static object from being lowered by the recognition assistances to be superimposed, in a case of the third example, it is desirable to use a transparent color or to change the transparency value of a color, which is not a transparent color, in accordance with time.

In a case of the fourth example described with reference to FIG. 7, similarly to the third example, the recognition assistance superimposition portion 16 first recognizes objects included in the moving body image SIM_1. When a dynamic object included in the moving body image SIM_1 is recognized, the recognition assistance superimposition portion 16 superimposes the recognition assistance AS_R11 or AS_L11 as the bounding box surrounding the dynamic object in accordance with the region in which the dynamic object is recognized.

Incidentally, in cases of the fourth example and of a modification of the fifth example (coloring for a track of a dynamic object), a case may be assumed where a dynamic object included in the moving body image SIM_1 is not recognized at all. Further, a case may also be assumed where the total number of dynamic objects included in the moving body image SIM_1 is small. In addition, it may be assumed that dynamic objects recognized in the moving body image SIM_1 are unevenly present in one region of the right region RA and the left region LA. Furthermore, a case may also be assumed where the total number of dynamic objects is too large.

When a dynamic object is not recognized at all, coloring is not applied to the moving body image SIM_1. Thus, in this case, misunderstanding of left and right with respect to the front of the moving body 1 highly possibly occurs. Thus, when the total number of dynamic objects is small and a case where the recognized dynamic objects are unevenly present in one region of the right region RA and the left region LA, the possibility remains that misunderstanding of left and right with respect to the front of the moving body 1 occurs. Meanwhile, when the total number of dynamic objects is too large, it is possible that visibility of the moving body image SIM_1 is lowered, instead.

Accordingly, in a case of the fourth example, it is desirable to count the number of dynamic objects included in the moving body image SIM_1, and it is desirable to count the number of dynamic objects included in each of the right region RA and the left region LA. In addition, it is desirable to determine whether or not the number of dynamic objects included in each of the right region RA and the left region LA of the front image SIM_11a is one or more and a dynamic object is included in dynamic objects included in at least one of the right region RA and the left region LA of the rear image SIM_11b. Then, when an affirmative result is obtained in this determination, it is desirable to employ the recognition assistance AS_R11 or AS_L11 as the bounding box.

Figure 13:
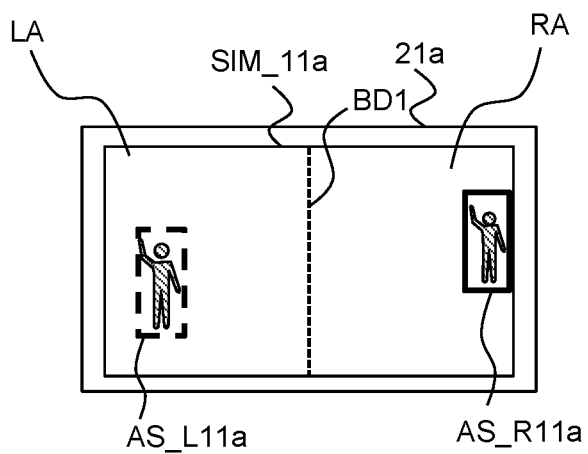
FIG. 13 is a diagram illustrating a first modification of the fourth example of the recognition assistance shown in FIG. 7.
Figure 13:
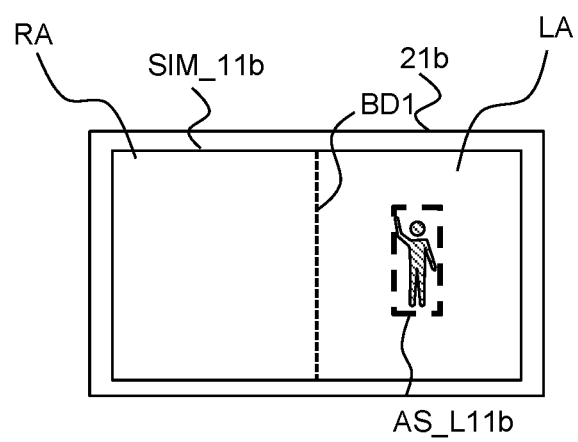

FIG. 13 is a diagram illustrating a first modification of the fourth example of the recognition assistance described with reference to FIG. 7. In the example illustrated in FIG. 13, an affirmative determination result is obtained in the determination based on the dynamic objects. Specifically, in the example illustrated in FIG. 13, one dynamic object is recognized in each of the right region RA and the left region LA of the front image SIM_11a, and one dynamic object is recognized in the left region LA of the rear image SIM_11b. Thus, a recognition assistance AS_R11a is superimposed on the right region RA of the front image SIM_11a, and a recognition assistance AS_L11a is superimposed on the left region LA. Further, a recognition assistance AS_L11b is superimposed on the left region LA of the rear image SIM_11b.

Figure 14:
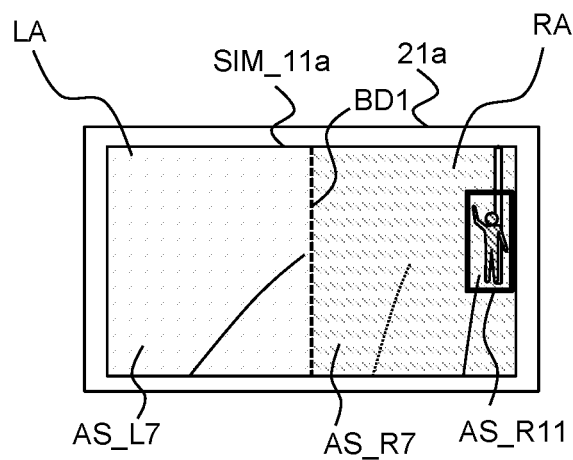
FIG. 14 is a diagram illustrating a second modification of the fourth example of the recognition assistance shown in FIG. 7.
Figure 14:
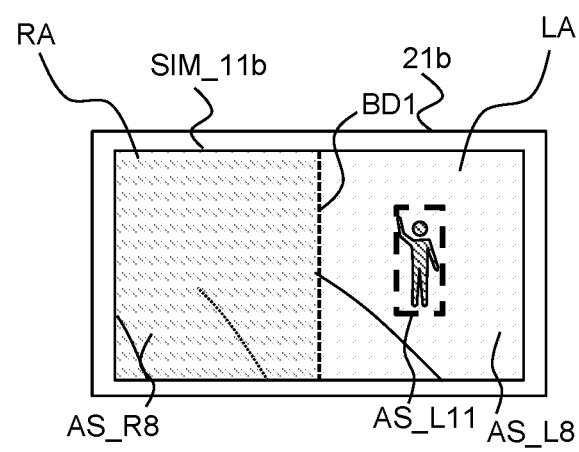

On the other hand, when a negative determination result is obtained in the determination based on the dynamic objects, it is desirable to appropriately combine the first to third examples or the fifth example (but limited to coloring for a track of a static object) with the fourth example. FIG. 14 is a diagram illustrating a second modification of the fourth example of the recognition assistance described with reference to FIG. 7. In the example illustrated in FIG. 14, a negative determination result is obtained in the determination based on the dynamic objects. Thus, in the example illustrated in FIG. 14, the recognition assistances AS_R7 and AS_R8 and the recognition assistances AS_L7 and AS_L8, which are described in the second example, are added to the moving body image SIM_1.

When the total number of dynamic objects is too large, it is desirable to select the dynamic objects on which the recognition assistance AS_R11 or AS_L11 is superimposed (in other words, the dynamic objects to which the bounding boxes are given) in accordance with a predetermined criterion. In this case, for example, it is determined whether or not the total number of dynamic objects in a focused image region (for example, the right region RA of the front image SIM_11a) is equivalent to or more than an upper limit.

Then, when it is determined that the total number of dynamic objects is equivalent to or more than the upper limit, it is assessed that the total number of dynamic objects is too large, the dynamic objects which satisfy any one of criteria (i) to (iii) are extracted.
 (i) A dynamic object whose distance from the moving body 1 is equivalent to or less than a predetermined distance.
 (ii) A dynamic object whose predicted collision time period (TTC) with the moving body 1 is equivalent to or less than a predetermined time period.
 (iii) A dynamic object for which monitoring by the operator OP is particularly necessary.

Extraction of the dynamic objects is desirably repeatedly performed until the total number of dynamic objects becomes smaller than the upper limit. In this case, for example, it is desirable to perform a change in extraction criteria such as extracting the dynamic objects which simultaneously satisfy two of the criteria (i) to (iii). The recognition assistance AS_R11 or AS_L11 as the bounding box is superimposed to surround the dynamic object which is extracted as described above.

Note that the above-described first and second modifications of the fourth example can be applied to the modification of the fifth example. This case can be described by appropriately replacing "bounding box" in the above description with "track of dynamic object".

In a case of the fourth example, other problems are assumed to occur. That is, when a dynamic object is positioned across the boundary BD1, it is difficult to assess which color of the recognition assistance AS_R11 or AS_L11 is employed. Accordingly, in this case, the ratios of the areas of the dynamic objects which occupy the right region RA and the left region LA are calculated, for example. Then, it is desirable to employ the same color as the color of the bounding boxes surrounding the dynamic objects included in a region with a higher area ratio as the color of the dynamic object across the boundary BD1.

However, it is possible that employing either one of the colors of the recognition assistances AS_R11 and AS_L11 as the color of the dynamic object across the boundary BD1 hinders recognition of left and right by the operator OP, instead. Accordingly, as the second modification of the fourth example, it is desirable to color the bounding box surrounding the dynamic object across the boundary BD1 with a color which is dissimilar both from the recognition assistance recognition AS_R11 and from the recognition assistance AS_L11 (in other words, a third color).

Figure 15:
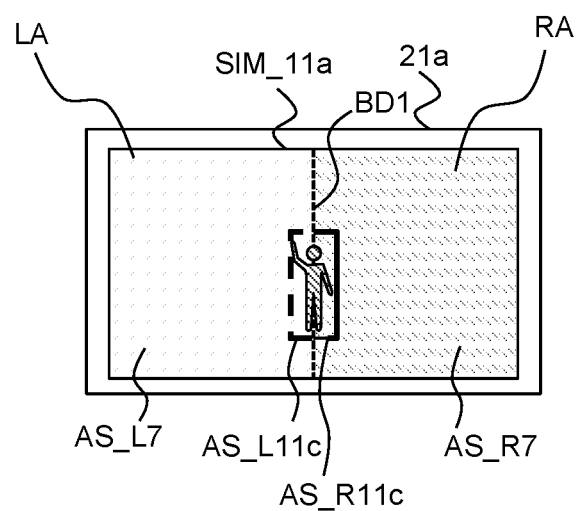
FIG. 15 is a diagram illustrating a third modification of the fourth example of the recognition assistance shown in FIG. 7.

As a third example of coloring for the bounding box surrounding the dynamic object across the boundary BD1, an example is possible where colors are changed at an intermediate position of the bounding box. FIG. 15 is a diagram illustrating a third modification of the fourth example of the recognition assistance described with reference to FIG. 7. In the example illustrated in FIG. 15, a recognition assistance AS_R11c is superimposed on a portion of the bounding box positioned in the right region RA, and a recognition assistance AS_L11c is superimposed on a portion of the bounding box positioned in the left region LA. The color of the recognition assistance AS_R11c is the same color as the color of the bounding box surrounding the dynamic object included in the right region RA, and the color of the recognition assistance AS_L11c is the same color as the color of the bounding box surrounding the dynamic object included in the left region LA.

As the third example of coloring for the bounding box surrounding the dynamic object across the boundary BD1, an example is possible where colors are changed at an intermediate position of the bounding box. FIG. 15 is a diagram illustrating the third modification of the fourth example described with reference to FIG. 7. In the example illustrated in FIG. 15, the recognition assistance AS_R11c is superimposed on a portion of the bounding box positioned in the right region RA, and the recognition assistance AS_L11c is superimposed on a portion of the bounding box positioned in the left region LA. The color of the recognition assistance AS_R11c is the same color as the color of the bounding box surrounding the dynamic object included in the right region RA, and the color of the recognition assistance AS_L11c is the same color as the color of the bounding box surrounding the dynamic object included in the left region LA.

Figure 16:
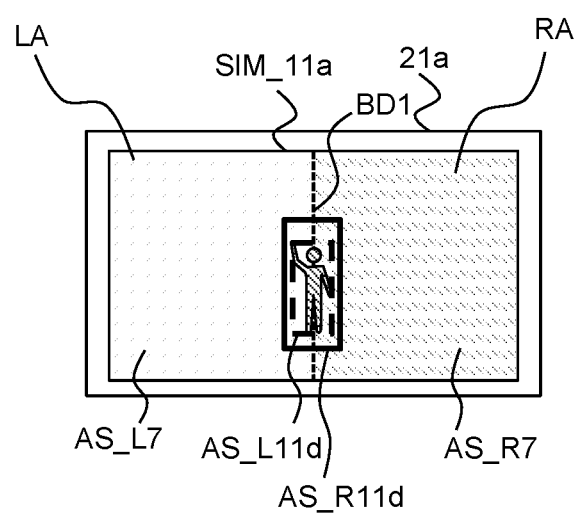
FIG. 16 is a diagram illustrating a fourth modification of the fourth example of the recognition assistance shown in FIG. 7.

As a fourth example of coloring for the bounding box surrounding the dynamic object across the boundary BD1, an example is possible where the bounding box is doubled. FIG. 16 is a diagram illustrating a fourth modification of the fourth example of the recognition assistance described with reference to FIG. 7. In the example illustrated in FIG. 16, as double bounding boxes surrounding the dynamic object across the boundary BD1, recognition assistances AS_R11d and AS_L11d are superimposed. The color of the recognition assistance AS_R11d is the same color as the color of the bounding box surrounding the dynamic object included in the right region RA, and the color of the recognition assistance AS_L11d is the same color as the color of the bounding box surrounding the dynamic object included in the left region LA.

Note that in the examples illustrated in FIGS. 15 and 16, the recognition assistances AS_R7 and AS_R8 and the recognition assistances AS_L7 and AS_L8, which are described in the second example, are added to the front images SIM_11a. However, those recognition assistances are arbitrarily added.

Incidentally, when the coloring for the bounding box surrounding the dynamic object across the boundary BD1 is a combination including warning colors such as "red" and "blue", the following problems are assumed to occur. That is, due to a change in the coloring for the bounding box from "red" to "blue" in response to movement of the dynamic object, the operator OP possibly misunderstands that a state of the dynamic object is changed to a safe state. Further, due to the change in the coloring for the bounding box from "blue" to "red", the operator OP possibly misunderstands that the state of the dynamic object is changed to a dangerous state. Accordingly, it is desirable that warning colors with lowered saturation and brightness be used for the coloring for the recognition assistances or warning colors be not used.

Returning to FIG. 11, the description about the functions of the data processing device 12 will be continued. The recognition assistance superimposition portion 16 transmits the moving body image SIM_1, on which the recognition assistances are superimposed, to the data transmission portion 17. The data transmission portion 17 encodes the moving body image SIM_1, on which the recognition assistances are superimposed, and transmits that to the terminal 2. In an encoding process, the moving body image SIM_1 may be compressed.

The data transmission portion 17 may transmit identification data (ID data) of the moving body 1 and data related to the moving body image SIM_1 together with the moving body image SIM_1. As the data related to the moving body image SIM_1, data of clock time when the moving body image SIM_1 is obtained and internal situation data (such as a speed, an acceleration, and a steering angle) of the moving body 1 at this clock time may be raised as examples.

2-2-2. Function Configuration Example of Data Processing Device 22

In the example illustrated in FIG. 11, the data processing device 22 includes a data reception portion 24 and a display control portion 25. Functions of blocks illustrated in the data processing device 22 are realized by execution of various programs by the processor 22a.

The data reception portion 24 receives various kinds of data from the moving body 1. The various kinds of data include the moving body image SIM_1. The various kinds of data may include the identification data (ID data) of the moving body 1 and data related to the moving body image SIM_1. Examples of data related to the moving body image SIM_1 have already been described. The data reception portion 24 decodes various kinds of data received from the moving body 1 and transmits the data to the display control portion 25. When various kinds of data are compressed, the data reception portion 24 decompresses the data in a decoding process.

The display control portion 25 performs various kinds of control to output various kinds of data received from the data reception portion 24 to the display 21. Various kinds of control include output control of the moving body image SIM_1. In the output control of the moving body image SIM_1, for example, a process is performed which is for displaying the front image SIM_11a on the display 21a and for displaying the rear image SIM_11b on the display 21b. In another example, a process is performed which is for displaying the front image SIM_11a in a main region of the display 21 and for displaying the data related to the moving body image SIM_1 in a subregion of this display 21. In still another example, a process is performed which is for displaying the rear image SIM_11b instead of the data related to the moving body image SIM_1 on the subregion.

3. Effects

In the first embodiment described above, the recognition assistances which are colored with different colors on left and right are superimposed on the moving body image SIM_1, the left and right being defined with the front of the moving body 1 being set as the reference, and the moving body image SIM_1 with the recognition assistances is output from the display 21. Consequently, it becomes possible to reduce occurrences of trouble that the operator OP makes a wrong recognition of left and right with respect to the front of the moving body 1 in the moving body image SIM_1. This helps the operator OP to make accurate decision in the remote work of the moving body 1, and contribution to safe movement of the moving body 1 by the remote work is expected.

Further, in the various modifications of the fourth example of the recognition assistance, it becomes possible to beforehand avoid occurrences of various kinds of trouble which are assumed to occur when the bounding box as the recognition assistance is superimposed on the moving body image SIM_1. This also helps the operator OP to make accurate decision in the remote work of the moving body 1, and contribution to safe movement of the moving body 1 by the remote work is expected.

Second Embodiment

Next, a second embodiment of the present disclosure will be described with reference to FIGS. 17 to 24. Note that descriptions common to the first embodiment will appropriately be skipped.

1. Outline

1-1. Remote Work

Figure 17:
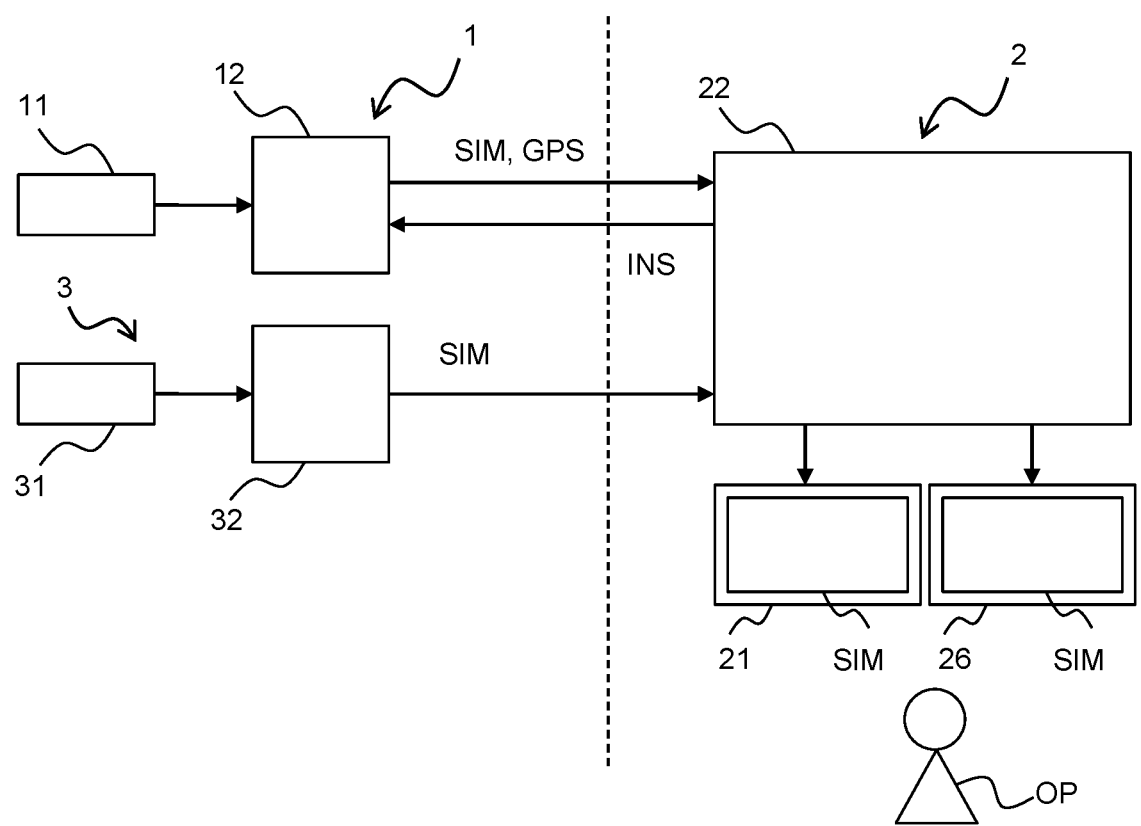
FIG. 17 is a diagram for explaining a presumed remote work in a second embodiment.

FIG. 17 is a diagram for explaining a presumed remote work in the second embodiment. FIG. 17 illustrates the moving body 1 and the terminal 2. The above description is the same as the description about FIG. 1. FIG. 17 further illustrates an infrastructure camera 3 and a display 26.

The infrastructure camera 3 is a camera which is installed in a structure (for example, a road structure or a facility structure such as a ceiling, a supporting column, or a wall surface of a parking lot, a factory, or the like). The total number of infrastructure cameras 3 is one or more. The infrastructure camera 3 and the terminal 2 communicate with each other via a base station of a network. The infrastructure camera 3 transmits a sensor image SIM to the terminal 2. In the following, the sensor image SIM to be transmitted from the infrastructure camera 3 will also be referred to as "infrastructure image SIM_3". The infrastructure image SIM_3 is generated based on data obtained from the infrastructure camera 3.

Similarly to the display 21, the display 26 is connected with the data processing device 22. In the example illustrated in FIG. 17, the infrastructure image SIM_3 is output to the display 26. Similarly to the total number of infrastructure cameras 3, the total number of displays 26 for outputting the infrastructure image SIM_3 is one or more. Note that the infrastructure image SIM_3 together with the moving body image SIM_1 may be output from the display 21. In this case, the display 26 may be omitted. For example, in a picture-in-picture technique, the moving body image SIM_1 can be displayed in a partial region of the display 21, and the infrastructure image SIM_3 can be displayed in another region of the display 21.

The positions in which the infrastructure cameras 3 are installed are known. In the second embodiment, the moving body 1 always transmits position data of the moving body 1 to the terminal 2. The data processing device 22 specifies the infrastructure cameras 3 whose distances from the present position of the moving body 1 are equivalent to or less than a predetermined value based on the position data of the moving body 1 and position data of the infrastructure cameras 3, for example. The predetermined value is set, for each of the infrastructure cameras 3, as a distance at which at least a part of the moving body 1 enters an angle of view of the infrastructure camera 3, for example. In another example, the predetermined value denotes a distance at which at least a part of the moving body 1 is predicted to enter the angle of view of the infrastructure camera 3 in a future in which a predetermined time period (for example, several seconds) elapses from the present clock time. When the infrastructure camera 3 is specified, the data processing device 22 outputs, from the display 26, the infrastructure image SIM_3 which is generated based on data obtained from the specified infrastructure camera 3.

In this example, a case will be considered where the remote work request is received from the moving body 1 or where the moving body image SIM_1 is received from the moving body 1 previously to transmission of this remote work request. The operator OP views the moving body image SIM_1 output from the display 21 and the infrastructure image SIM_3 output from the display 26 and understands contents of the remote work request. Alternatively, the operator OP views the infrastructure image SIM_3 output from the display 26 and understands a situation of the moving body 1. Then, the operator OP makes decision about an action to be performed by the moving body 1 and inputs a command corresponding to this action to the terminal 2.

When the remote work request is received from the moving body 1 or a case where the moving body image SIM_1 is received from the moving body 1 previously to transmission of this remote work request, the data processing device 22 may specify the infrastructure camera 3 whose distance from the present position of the moving body 1 is equivalent to or less than a predetermined value. When the infrastructure camera 3 is specified, the data processing device 22 outputs, from the display 26, the infrastructure image SIM_3 which is generated based on data obtained from the specified infrastructure camera 3.

Figure 18:
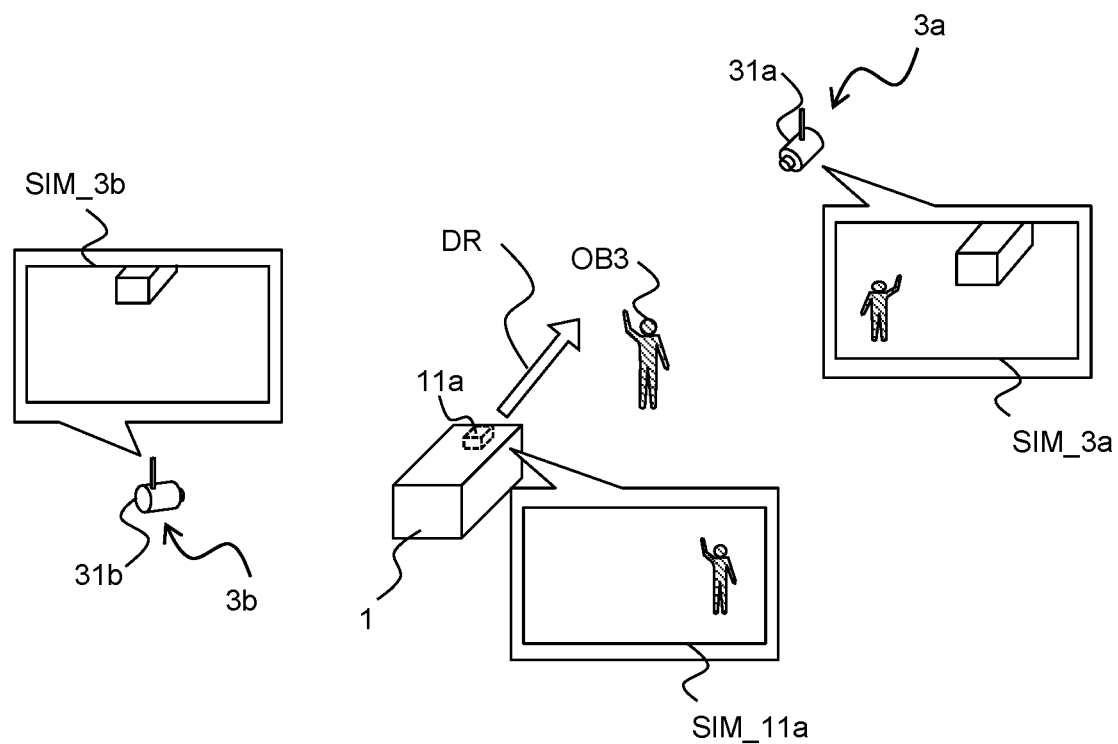
FIG. 18 is a diagram for explaining examples of a moving body image and an infrastructure image.

FIG. 18 is a diagram for explaining examples of the moving body image SIM_1 and the infrastructure image SIM_3. FIG. 18 illustrates a vehicle as the moving body 1 and the sensor 11a mounted on the vehicle. A direction DR of an arrow indicated in FIG. 18 represents a traveling direction of the moving body 1. FIG. 18 also illustrates a camera body 31a of an infrastructure camera 3a and a camera body 31b of an infrastructure camera 3b. In the example illustrated in FIG. 18, the infrastructure cameras 3a and 3b are the infrastructure cameras 3 whose distances from the present position of the moving body 1 are equivalent to or less than the predetermined value. The camera body 31a is positioned in right front of the moving body 1, and the camera body 31b is positioned in left rear of the moving body 1.

A front image SIM_11a illustrated in FIG. 18 is one example of the moving body image SIM_1 generated based on data obtained from the sensor 11a. The front image SIM_11a includes an image of a dynamic object OB3 (pedestrian) which is present in the right front of the moving body 1. An infrastructure image SIM_3a is generated based on data obtained from the camera body 31a and includes images of the dynamic object OB3 and the moving body 1, here. An infrastructure image SIM_3b is generated based on data obtained from the camera body 31b and includes an image of the moving body 1 (an image of a rear portion of the moving body 1), here.

1-2. Recognition Assistance

Similarly to the first embodiment, in the second embodiment also, the recognition assistance is superimposed on the moving body image SIM_1, and the moving body image SIM_1 with the recognition assistance is output from the display 21. In the second embodiment, in addition, the recognition assistance is superimposed also on the infrastructure image SIM_3, and the infrastructure image SIM_3 with the recognition assistance is output from the display 26. As examples of the recognition assistances to be superimposed on the infrastructure image SIM_3, the same examples as the first to sixth examples described with reference to FIGS. 4 to 9 may be raised. As a representative, a description will be made about the first example of the recognition assistance described with reference to FIG. 4.

Figure 19:
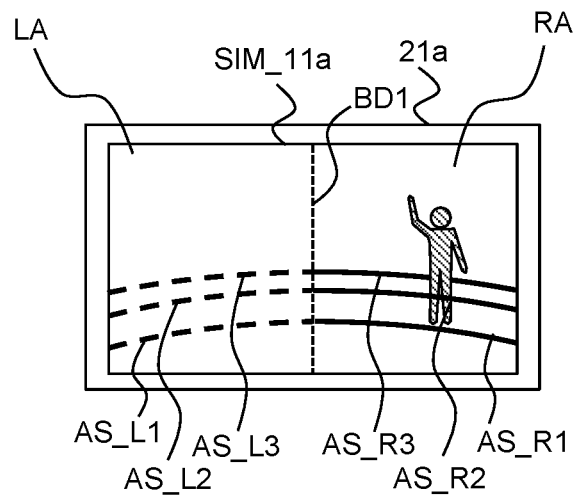
FIG. 19 is a diagram for explaining a case where the first example of the recognition assistance shown in FIG. 4 is applied to the infrastructure image.
Figure 19:
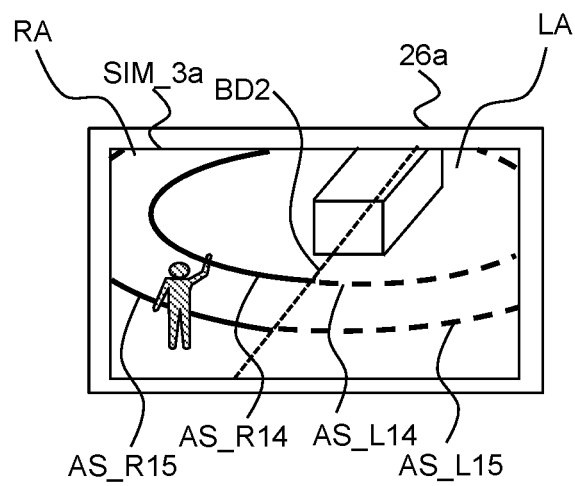
Figure 19:
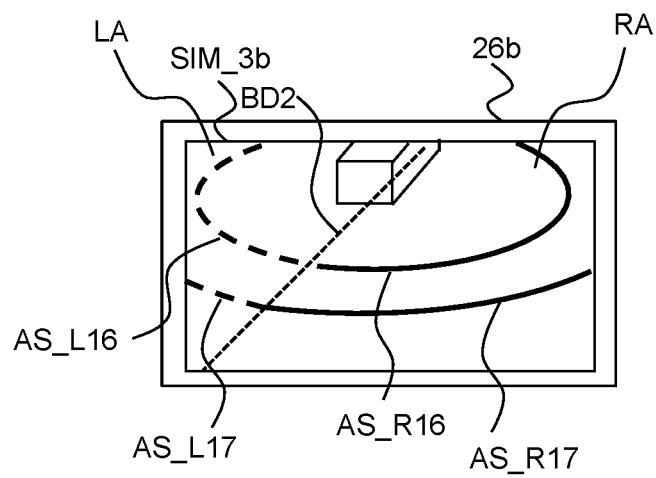

FIG. 19 is a diagram for explaining a case where the first example of the recognition assistance described with reference to FIG. 4 is applied to the infrastructure image SIM_3. FIG. 19 illustrates the front image SIM_11a and the infrastructure images SIM_3a and SIM_3b. The front image SIM_11a is output to the display 21a, the infrastructure image SIM_3a is output to a display 26a, and the infrastructure image SIM_3b is output to a display 26b.

In the example illustrated in FIG. 19, the front image SIM_11a is demarcated by the boundary BD1 into the left region LA and the right region RA. The recognition assistances AS_R1 to AS_R3 in the circular arc shapes are superimposed on the right region RA, and the recognition assistances AS_L1 to AS_L3 in the circular arc shapes are superimposed on the left region LA. The recognition assistances AS_L1 to AS_L3 are colored with dissimilar colors from the recognition assistances AS_R1 to AS_R3. To this point, the example is provided in the same manner as the description about the front image SIM_11a in FIG. 4.

In the example illustrated in FIG. 19, further, the infrastructure images SIM_3a and SIM_3b are demarcated by a boundary BD2 into the left regions LA and the right regions RA. In the infrastructure image SIM_3a, recognition assistances AS_R14 and AS_R15 in circular arc shapes are superimposed on the right region RA, and recognition assistances AS_L14 and AS_L15 in circular arc shapes are superimposed on the left region LA. In the infrastructure image SIM_3b, recognition assistances AS_R16 and AS_R17 in circular arc shapes are superimposed on the right region RA, and recognition assistances AS_L16 and AS_L17 in circular arc shapes are superimposed on the left region LA.

Similarly to circular arcs drawn on the front image SIM_11a and the rear image SIM_11b, circular arcs drawn on the infrastructure images SIM_3a and SIM_3b are parts of concentric circumferences drawn on a virtual horizontal plane around a reference point of the moving body 1 (for example, the present position of the moving body 1). For example, the recognition assistance AS_R1 constitutes the same circle as the recognition assistances AS_R14 and AS_R16, and the recognition assistance AS_R2 constitutes the same circle as the recognition assistances AS_R15 and AS_R17. The recognition assistance AS_L1 constitutes the same circle as the recognition assistances AS_L14 and AS_L16, and the recognition assistance AS_L2 constitutes the same circle as the recognition assistances AS_L15 and AS_L17.

As described above, in the second embodiment, the infrastructure image SIM_3 is generated based on the data obtained from the infrastructure camera 3 whose distance from the present position of the moving body 1 is equivalent to or less than the predetermined value (such as the distance at which at least a part of the moving body 1 is predicted to enter an angle of view of the infrastructure camera 3 in the future in which the predetermined time period elapses from the present clock time). Then, the recognition assistances which are colored with different colors on left and right are superimposed on the infrastructure image SIM_3, the left and right being defined with the front of the moving body 1 being set as the reference, and the infrastructure image SIM_3 with the recognition assistances is output from the display 26. Consequently, this helps the operator OP to make accurate decision in the remote work of the moving body 1, and contribution to safe movement of the moving body 1 by the remote work is expected.

2. System Configuration Example

2-1. General Configuration Example

Figure 20:
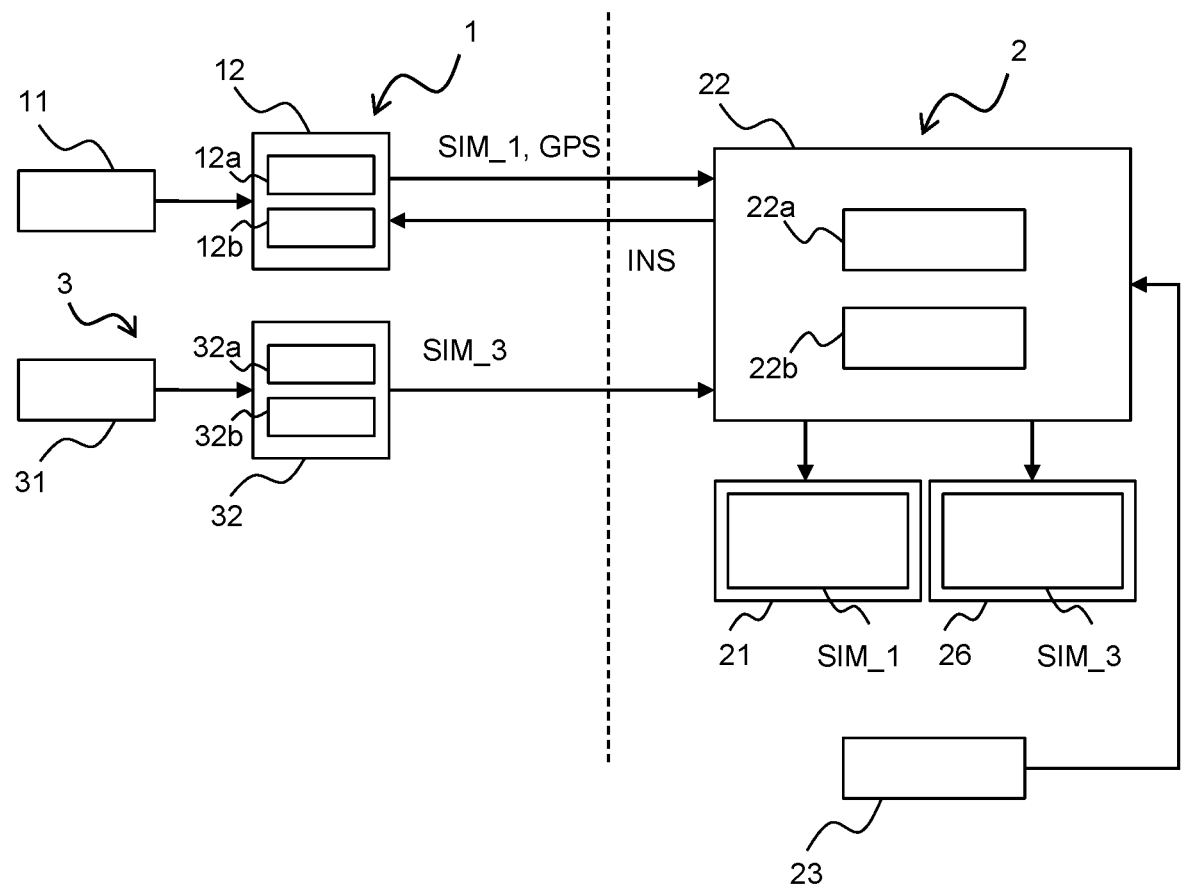
FIG. 20 is a block diagram illustrating a configuration example of a display system according to the second embodiment.

FIG. 20 is a block diagram illustrating a configuration example of a display system according to the second embodiment. In the example illustrated in FIG. 20, as a configuration of the display system according to the second embodiment, the moving body 1, the terminal 2, and the infrastructure camera 3 are illustrated.

The configuration of the moving body 1 has already been described in the first embodiment. The terminal 2 includes the displays 21 and 26, the data processing device 22, and the input device 23. The infrastructure image SIM_3 generated based on data obtained from the infrastructure camera 3 is output to the display 26.

The infrastructure camera 3 includes the camera body 31 and a data processing device 32. The configuration of the camera body 31 is basically the same as the configuration of the camera as the sensor 11. The data processing device 32 includes at least one processor 32a and at least one memory 32b. The processor 32a executes a program for image processing, which is stored in the memory 32b, and thereby performs various processes related to generation of the infrastructure image SIM_3. Further, the processor 32a executes a program for image transmission, which is stored in the memory 32b, and thereby performs various processes for transmitting the generated infrastructure image SIM_3 to the terminal 2.

2-2. Function Configuration Example

2-2-1. Function Configuration Example of Data Processing Device 32

Figure 21:
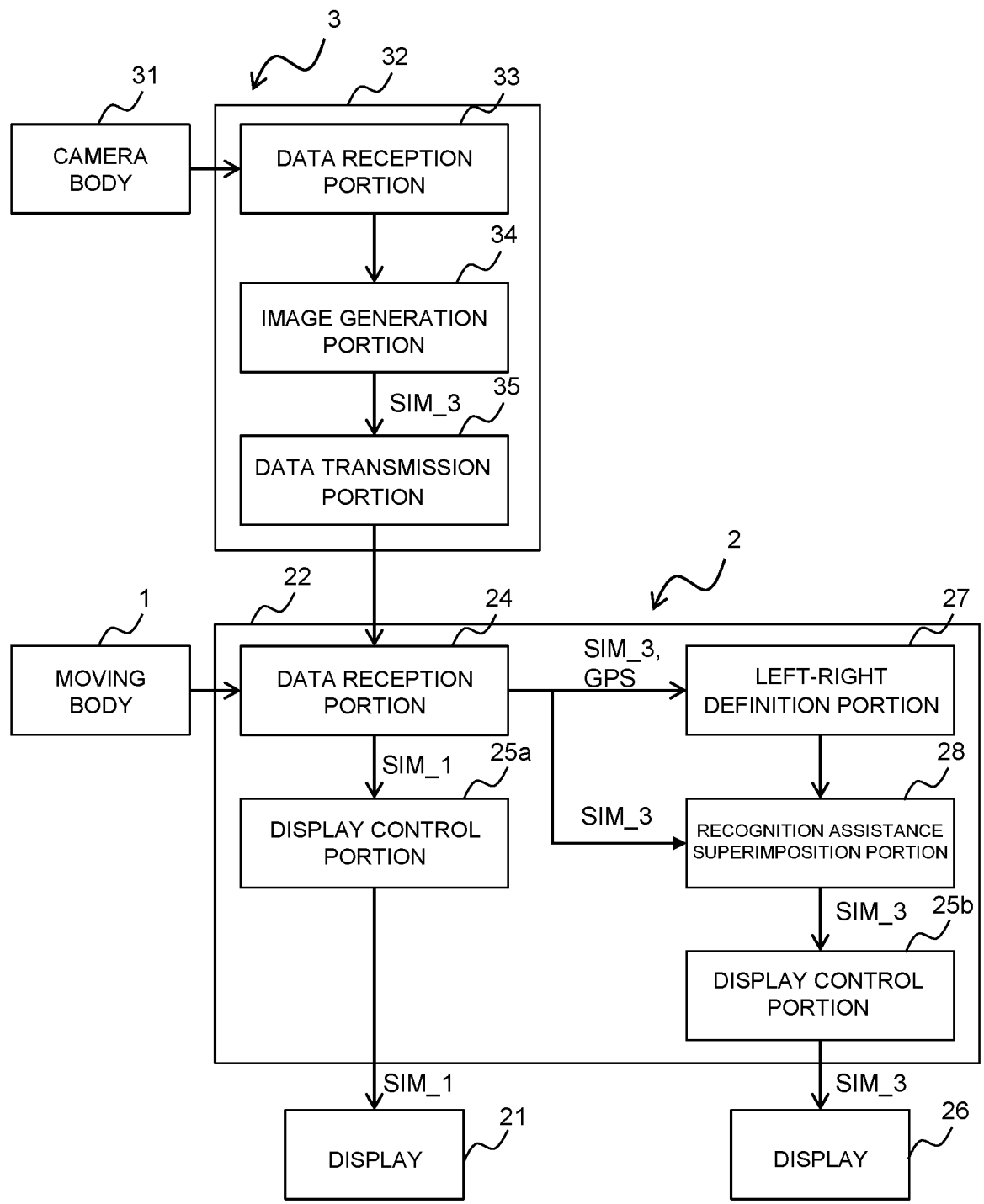
FIG. 21 is a block diagram illustrating a configuration example of functions which are particularly related to the second embodiment.

FIG. 21 is a block diagram illustrating a configuration example of functions which are particularly related to the second embodiment. In the example illustrated in FIG. 21, the data processing device 32 includes a data reception portion 33, an image generation portion 34, and a data transmission portion 35. Functions of blocks illustrated in the data processing device 32 are realized by execution of various programs by the processor 32a.

The data reception portion 33 receives a color image detected by the camera body 31. The data reception portion 33 transmits the color image to the image generation portion 34.

The image generation portion 34 generates the sensor image SIM (infrastructure image SIM_3) based on the color image received from the data reception portion 33. The image generation portion 34 transmits the generated infrastructure image SIM_3 to the data transmission portion 35.

The data transmission portion 35 encodes the infrastructure image SIM_3 received from the image generation portion 34 and transmits that to the terminal 2. In an encoding process, the infrastructure image SIM_3 may be compressed. The data transmission portion 35 may transmit, together with the infrastructure image SIM_3, identification data of the infrastructure camera 3, position data (for example, latitude-longitude data) of the infrastructure camera 3, and data related to the infrastructure image SIM_3. As the data related to the infrastructure image SIM_3, data of clock time when the infrastructure image SIM_3 is obtained may be raised as an example.

2-2-2. Function Configuration Example of Data Processing Device 22

In the example illustrated in FIG. 21, the data processing device 22 includes the data reception portion 24. The above description is the same as the description about FIG. 11. In the example illustrated in FIG. 21, the data processing device 22 further includes display control portions 25a and 25b, a left-right definition portion 27, and a recognition assistance superimposition portion 28. Functions of blocks illustrated in the data processing device 22 are realized by execution of various programs by the processor 22a.

The data reception portion 24 receives various kinds of data from the moving body 1. The various kinds of data include the moving body image SIM_1. The various kinds of data may include identification data of the moving body 1, position data (GPS data) of the moving body 1, and data related to the moving body image SIM_1. The position data is latitude-longitude data obtained by a Global Positioning System (GPS) receiver mounted on the moving body 1, for example. Examples of data related to the moving body image SIM_1 have already been described. The data reception portion 24 decodes various kinds of data received from the moving body 1 and transmits the data to the display control portion 25a. Functions of the display control portion 25a are the same as the functions of the display control portion 25, which are described in FIG. 11.

Further, the data reception portion 24 receives various kinds of data from the infrastructure camera 3. The various kinds of data include the infrastructure image SIM_3. The various kinds of data may include the identification data of the infrastructure camera 3, the position data of the infrastructure camera 3, and data related to the infrastructure image SIM_3. Examples of data related to the infrastructure image SIM_3 have already been described. The data reception portion 24 decodes various kinds of data received from the infrastructure camera 3 and transmits the data to the left-right definition portion 27 and the recognition assistance superimposition portion 28.

Figure 22:
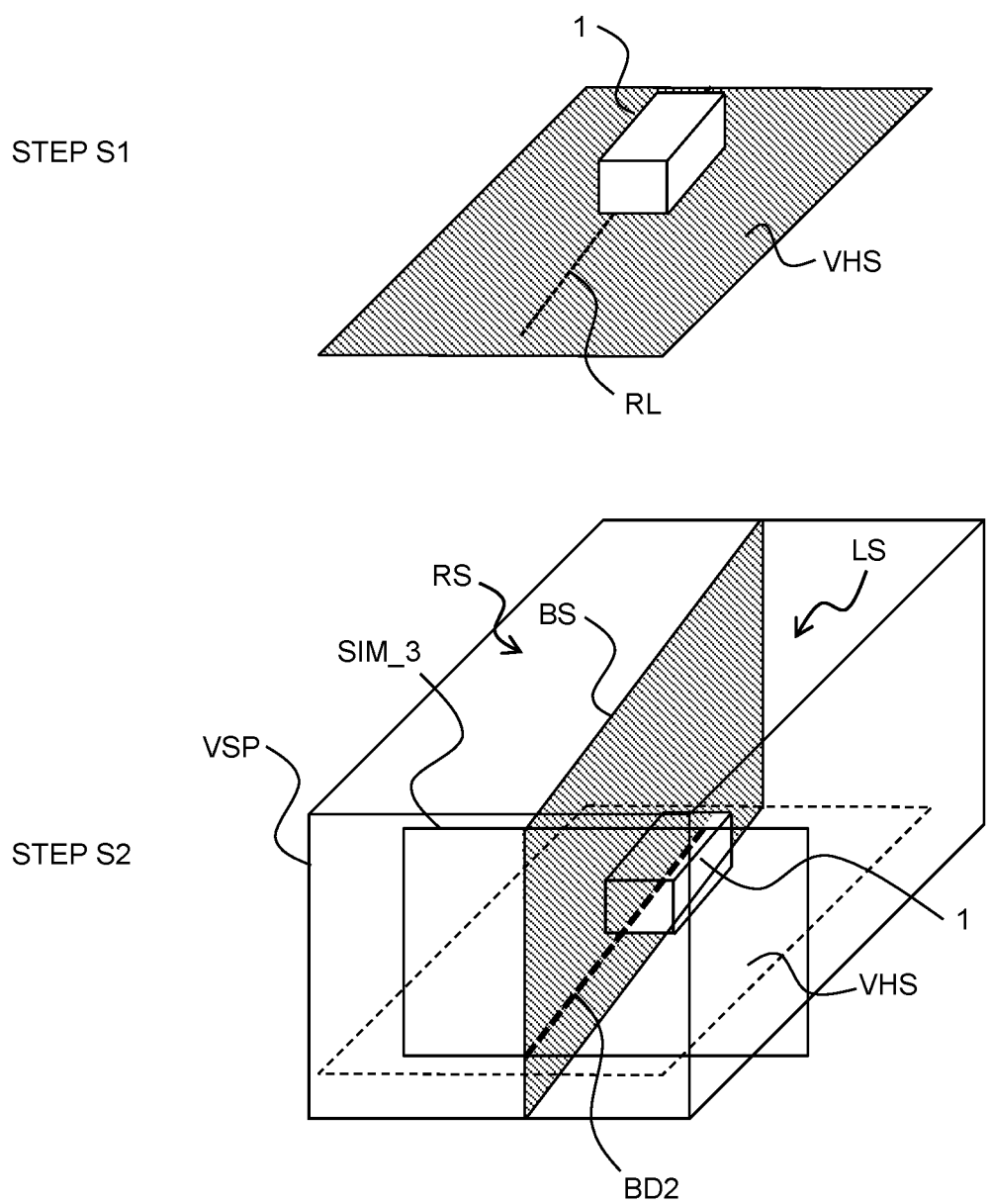
FIG. 22 is a diagram for explaining a processing example by the left-right definition portion.

The left-right definition portion 27 defines left and right in the infrastructure image SIM_3. The left-right definition portion 27 first sets a boundary. FIG. 22 is a diagram for explaining a processing example by the left-right definition portion 27. Note that in FIG. 22, a description will be made about a processing example of the infrastructure image SIM_3a described with reference to FIG. 18. In the example illustrated in FIG. 22, a virtual horizontal plane VHS is first set which passes through the reference point (for example, the present position of the moving body 1) of the moving body 1 (step S1).

After the virtual horizontal plane VHS is set, a reference line RL extending in a front-rear direction of the moving body 1 is set on the virtual horizontal plane VHS (step S1). The front-rear direction is estimated based on a history of the position data of the moving body 1 in a period from predetermined time before the present clock time, for example. In the example illustrated in FIG. 22, the reference line RL is set by projecting a straight line extending in this estimated direction onto the virtual horizontal plane VHS.

After the reference line RL is set, a plane (in other words, a boundary plane BS) is set which includes the reference line RL and is orthogonal to the virtual horizontal plane VHS (step S2). After the boundary plane BS is set, in a virtual space VSP including the boundary plane BS and the virtual horizontal plane VHS, a right space RS and a left space LS with respect to the front of the moving body 1 can be defined.

The left-right definition portion 27 applies the virtual space VSP, which includes the boundary plane BS and the virtual horizontal plane VHS, to the infrastructure image SIM_3 (step S2). Accordingly, the boundary BD2 can be set which is drawn by the boundary plane BS on the infrastructure image SIM_3. After the boundary BD2 is set, the right region RA and the left region LA with respect to the front of the moving body 1 can be set on the infrastructure image SIM_3.

The left-right definition portion 27 transmits data of the right region RA and the left region LA in the infrastructure image SIM_3 to the recognition assistance superimposition portion 28. The left-right definition portion 27 transmits data of pixel coordinates, which constitute the boundary BD2 in the infrastructure image SIM_3, to the recognition assistance superimposition portion 28, for example. When the recognition assistances in the circular arc shapes are superimposed on the infrastructure image SIM_3 (in other words, a case of the first example described with reference to FIG. 19), the left-right definition portion 27 transmits data of pixel coordinates, which constitute the virtual horizontal plane VHS in the infrastructure image SIM_3, to the recognition assistance superimposition portion 28.

The recognition assistance superimposition portion 28 superimposes the recognition assistance on the infrastructure image SIM_3 based on the infrastructure image SIM_3 received from the data reception portion 24 and various kinds of data which are received from the left-right definition portion 27 and are related to the infrastructure image SIM_3.

In a case of the first example described with reference to FIG. 19, the recognition assistance superimposition portion 28 uses the data of the pixel coordinates, which constitute the virtual horizontal plane VHS in the infrastructure image SIM_3, and thereby draws virtual concentric circles, around the reference point of the moving body 1, on the virtual horizontal plane VHS. Next, the recognition assistance superimposition portion 28 applies the virtual concentric circles to the infrastructure image SIM_3, superimposes the recognition assistances AS_R14 to AS_R17 on the right region RA, and superimposes the recognition assistances AS_L14 to AS_L17 on the left region LA.

The second to sixth examples of the recognition assistance, which are described with reference to FIGS. 5 to 9 in the first embodiment, can also be applied to the second embodiment. Those examples can be described by appropriately replacing "moving body image SIM_1" in the description about "recognition assistance superimposition portion 16" in FIG. 11 with "infrastructure image SIM_3".

Returning to FIG. 21, the description about the functions of the data processing device 22 will be continued. The recognition assistance superimposition portion 28 transmits the infrastructure image SIM_3, on which the recognition assistances are superimposed, to the display control portion 25b. The display control portion 25b performs various kinds of control to output various kinds of data received from the data reception portion 24 to the display 26. Various kinds of control include output control of the infrastructure image SIM_3. In the output control of the infrastructure image SIM_3, for example, a process is performed which is for displaying the infrastructure image SIM_3a on the display 26a and for displaying the infrastructure image SIM_3b on the display 26b.

Incidentally, when the infrastructure image SIM_3 is output from the display 26, there is a problem that it is difficult to enable the operator OP to instantly recognize the front and rear of the moving body 1 included in the infrastructure image SIM_3. Accordingly, in this case, it is desirable that by modifying the first example described with reference to FIG. 19, the right regions RA and the left regions LA in the moving body image SIM_1 and the infrastructure image SIM_3 be subdivided in the front-rear direction.

Figure 23:
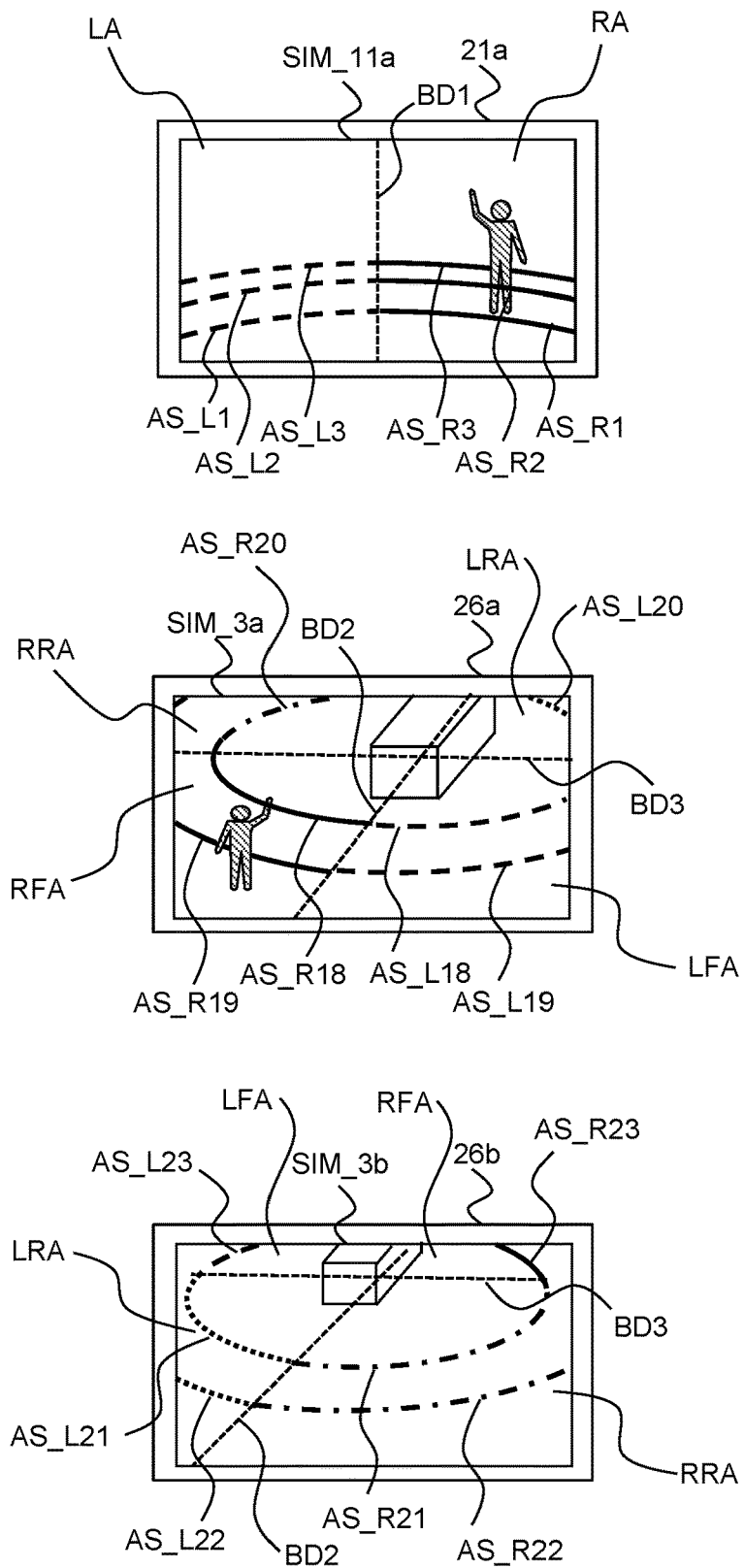
FIG. 23 is a diagram for explaining an example of subdividing processing of a right region and a left region in the infrastructure image.

FIG. 23 is a diagram for explaining an example of subdividing processing of the right region RA and the left region LA in the infrastructure image SIM_3. Note that this subdividing processing can be performed by the left-right definition portion 27 described with reference to FIG. 21. Similarly to FIG. 19, FIG. 23 illustrates the front image SIM_11a and the infrastructure images SIM_3a and SIM_3b. The front image SIM_11a is the same as that illustrated in FIG. 19.

In the example illustrated in FIG. 23, a boundary BD3 is added to the infrastructure images SIM_3a and SIM_3b. The boundary BD3 can be set by a similar procedure to a setting procedure of the boundary BD2. Specifically, first, the line orthogonal to the reference line RL (hereinafter, also referred to as "additional reference line") described with reference to FIG. 22 is set on the virtual horizontal plane VHS. Next, a plane (hereinafter, also referred to as "additional boundary plane") is set which includes this additional reference line and is orthogonal to the virtual horizontal plane VHS. Then, a virtual space including the additional boundary plane and the virtual horizontal plane VHS is applied to the infrastructure image SIM_3. Accordingly, the boundary (additional boundary) BD3 which is drawn by the additional boundary plane can be set in the infrastructure image SIM_3.

After the boundary BD3 is set, the right region RA can be divided into a right front region RFA and a right rear region RRA, and the left region LA can be divided into a left front region LFA and a left rear region LRA. By using data of those regions, information of the front-rear direction can be given to the infrastructure images SIM_3a and SIM_3b. Note that this process can be performed by the recognition assistance superimposition portion 28 described with reference to FIG. 21.

FIG. 23 illustrates the infrastructure images SIM_3a and SIM_3b in which the recognition assistances are superimposed on four kinds of regions. Specifically, recognition assistances AS_R18 and AS_R19 are superimposed on the right front region RFA of the infrastructure image SIM_3a, recognition assistances AS_L18 and AS_L19 are superimposed on the left front region LFA, a recognition assistance AS_R20 is superimposed on the right rear region RRA, and a recognition assistance AS_L20 is superimposed on the left rear region LRA. Recognition assistances AS_R21 and AS_R22 are superimposed on the right rear region RRA of the infrastructure image SIM_3b, recognition assistances AS_L21 and AS_L22 are superimposed on the left rear region LRA, a recognition assistance AS_R23 is superimposed on the right front region RFA, and a recognition assistance AS_L23 is superimposed on the left front region LFA.

The recognition assistances illustrated in FIG. 23 are colored in accordance with the regions on which those recognition assistances are superimposed. In other words, in the example illustrated in FIG. 23, the recognition assistances AS_R18, AS_R19, and AS_R23 which are superimposed on the right front region RFA of the infrastructure image SIM_3 are colored with a different color from the recognition assistances AS_R20, AS_R21, and AS_R22 which are superimposed on the right rear region RRA of the infrastructure image SIM_3. However, the recognition assistances AS_R18 to AS_R23 are colored with a similar color to the recognition assistances AS_R1 to AS_R3 on the front image SIM_11a. In other words, the recognition assistances AS_R18, AS_R19, and AS_R23 are colored with a color similar to and different from the recognition assistances AS_R20, AS_R21, and AS_R22.

Further, the recognition assistances AS_L18, AS_L19, and AS_L23 which are superimposed on the left front region LFA of the infrastructure image SIM_3 are colored with a color similar to and different from the recognition assistances AS_L20, AS_L21, and AS_L22 which are superimposed on the left rear region LRA of the infrastructure image SIM_3. Note that the fact that the color of the recognition assistances AS_L18 to AS_L23 are not a similar color to the color of the recognition assistances AS_R18 to AS_R23 is a matter to be easily understood from the gist of the present disclosure.

As another example which helps instant recognition of the front and rear of the moving body 1 included in the infrastructure image SIM_3, it is possible to separately provide a display which outputs a map image of a periphery of the present position of the moving body 1. Because the present position of the moving body 1 can be known from the position data, the map image of the periphery of the present position is obtained from a map database or the like, and an icon symbolizing the infrastructure camera 3, an icon symbolizing the moving body 1, and a pictogram which is colored with a similar color to the color of the recognition assistance output from the display 26 are superimposed on the map image and are output from the display.

Figure 24:
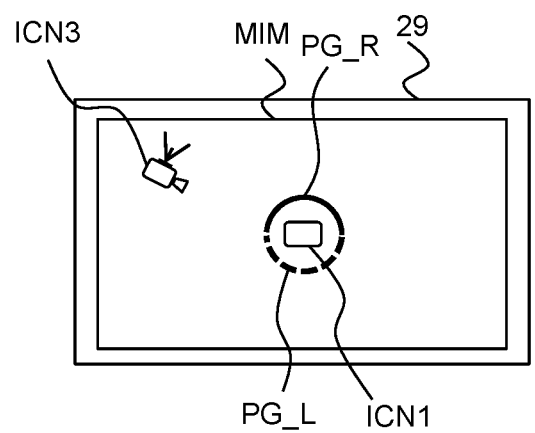
FIG. 24 is a diagram for explaining a processing example of superimposing various icons on a map image.

FIG. 24 is a diagram for explaining a processing example of superimposing various icons on a map image. In the example illustrated in FIG. 24, a map image MIM on which an icon ICN3 symbolizing the infrastructure camera 3 and an icon ICN1 symbolizing the moving body 1 are superimposed is output from a display 29. Further, a pictogram PG_R colored with a similar color to the color of the recognition assistances AS_R14 to AS_R17 output from the display 26 and a pictogram PG_L colored with a similar color to the color of the recognition assistances AS_L14 to AS_L17 are superimposed on the map image MIM.

3. Effects

In the second embodiment described above, the infrastructure image SIM_3 is generated based on the data obtained from the infrastructure camera 3 whose distance from the present position of the moving body 1 is equivalent to or less than the predetermined value. Then, the recognition assistances which are colored with different colors on left and right are superimposed on the infrastructure image SIM_3, the left and right being defined with the front of the moving body 1 being set as the reference, and the infrastructure image SIM_3 with the recognition assistances is output from the display 26. Consequently, this helps the operator OP to make accurate decision in the remote work of the moving body 1, and contribution to safe movement of the moving body 1 by the remote work is expected.

Further, in the modification of the first example of the recognition assistance which is described in FIG. 23, the recognition assistances which are colored with different colors in right front, left front, right rear, and left rear are superimposed on the infrastructure image SIM_3, the right front, left front, right rear, and left rear being defined with the front of the moving body 1 being set as the reference, and the infrastructure image SIM_3 with the recognition assistances is output from the display 26. Consequently, it becomes possible for the operator OP to instantly recognize the front and rear of the moving body 1. This also helps the operator OP to make accurate decision in the remote work of the moving body 1, and contribution to safe movement of the moving body 1 by the remote work is expected.

Further, in a modification which is described in FIG. 24 and uses the map image, it becomes possible for the operator OP to instantly recognize the front and rear of the moving body 1. In addition, it becomes possible to instantly know relative positions of the infrastructure camera 3 and the moving body 1 and the traveling direction of the moving body 1. This also helps the operator OP to make accurate decision in the remote work of the moving body 1, and contribution to safe movement of the moving body 1 by the remote work is expected.

Note that the modification which is described in FIG. 24 and uses the map image MIM may be applied to the first embodiment. In this case, the map image MIM which is illustrated in FIG. 24 and from which the icon ICN3 is removed is output from the display 29. Further, the pictograms PG_R and PG_L are colored with similar colors to the color of the recognition assistances output from the display 21.

Third Embodiment

Finally, a third embodiment of the present disclosure will be described. Note that descriptions common to the first and second embodiments will appropriately be skipped.

In the second embodiment, the moving body image SIM_1 and the infrastructure image SIM_3 are combined and output from the displays 21 and 26. In the third embodiment, only the infrastructure image SIM_3 is output from the display 26. In other words, in the third embodiment, no moving body image SIM_1 is generated, and no moving body image SIM_1 is output from the display 21. When the infrastructure image SIM_3 is output from the display 26, the display 21 may be omitted. When the infrastructure image SIM_3 may be output from the display 21, and in this case, the display 26 may be omitted.

A case is assumed where it is desirable not to output the moving body image SIM_1 from the display 21 before the remote work request is received from the moving body 1. For example, when the operator OP waits for remote work requests from plural moving bodies 1, it is desirable that plural infrastructure images SIM_3 generated based on data obtained from the infrastructure cameras 3 be respectively output from plural displays 26.

In this case, when the remote work request is received from one of the plural moving bodies 1, outputs of the infrastructure images SIM_3 are finished, the infrastructure images SIM_3 being other than the infrastructure images SIM_3 which correspond to the infrastructure cameras whose distances from the above moving body 1 are equivalent to or less than a predetermined value. Then, the moving body image SIM_1 of the moving body 1 performing the remote work is output from the display 21.

What is claimed is:

1. A remote image display method to display a sensor image generated based on data obtained from a remote sensor on a display of a terminal communicating with the remote sensor, the remote sensor including a sensor mounted on a moving body, the sensor image including a moving body image representing an image generated based on data obtained from the sensor mounted on the moving body, the method comprising the steps of:

setting a reference line which extends in a front-rear direction of the moving body on a virtual horizontal plane which passes through a reference point of the moving body;

defining right and left spaces with respect to front of the moving body in a virtual space which includes the virtual horizontal plane by using the reference line;

setting right and left regions with respect to the front of the moving body in the moving body image by using the virtual space in which the right and left spaces are defined;

superimposing right and left recognition assistances respectively on the right and left regions of the moving body image, in which a color of the right recognition assistance is different from a color of the left recognition assistance; and outputting the moving body image on which the right and left recognition assistances are superimposed from the display, wherein the right and left recognition assistances include coloring applied to circular arcs concentrically drawn on the virtual horizontal plane around the reference point of the moving body.

2. The method according to claim 1, wherein
the right and left recognition assistances further include coloring applied to at least a part of each region of the right and left regions, coloring applied to a static object which is recognized in the moving body image, coloring applied to a bounding box which surrounds a dynamic object recognized in the moving body image, coloring applied to a track of the dynamic object, and coloring applied to a track of the moving body.

3. The method according to claim 2, wherein
the right and left recognition assistances are provided as a combination of at least one which is selected from the coloring applied to the circular arcs, the coloring applied to at least a part of each region of the right and left regions, the coloring applied to the static object, and the coloring applied to the track of the moving body and at least one which is selected from the coloring applied to the bounding box and the coloring applied to the track of the dynamic object.

4. The method according to claim 2, further comprising the steps of:
determining whether or not a dynamic object across a boundary which separates the right region from the left region is recognized in the moving body image; and
doubling the bounding box which surrounds the dynamic object across the boundary and of applying colors of the right and left recognition assistances respectively to the bounding boxes when a determination is made that the dynamic object across the boundary is recognized in the moving body image.

5. The method according to claim 2, further comprising the steps of:
determining whether or not a dynamic object across a boundary which separates the right region from the left region is recognized in the moving body image; and
applying a different color from colors of both of the right and left recognition assistances to the bounding box which surrounds the dynamic object across the boundary when a determination is made that the dynamic object across the boundary is recognized in the moving body image.

6. The method according to claim 2, further comprising the steps of:
determining whether or not the total number of dynamic objects is equivalent to or greater than an upper limit; and
selecting dynamic objects to which the bounding boxes are given in accordance with a predetermined criterion when it is determined that the total number is equivalent to or greater than the upper limit.

7. The method according to claim 1,
wherein the moving body image includes front and rear images of the moving body,
wherein the step of superimposing the right and left recognition assistances on the moving body image further includes the steps of:
setting similar colors to a color of the right recognition assistance to be superimposed on the front image and to a color of the right recognition assistance to be superimposed on the rear image; and
setting similar colors to a color of the left recognition assistance to be superimposed on the front image and to a color of the left recognition assistance to be superimposed on the rear image.

8. The method according to claim 7, further comprising the steps of:
determining whether or not the number of dynamic objects recognized in each of the right and left regions of the front image is equivalent to or greater than one;
determining whether or not a dynamic object is recognized in at least one of the right and left regions of the rear image; and
employing coloring applied to a bounding box which surrounds a dynamic object recognized in the front and rear images as the right and left recognition assistances when a determination is made that the number of dynamic objects recognized in each of the right and left regions of the front image is equivalent to or greater than one and that a dynamic object is recognized in at least one of the right and left regions of the rear image.

9. The method according to claim 1,
wherein a boundary which separates the right region from the left region includes a boundary which has a predetermined shape,
wherein the method further comprises the steps of superimposing the recognition assistance on the boundary which has the predetermined shape, in which a color of the recognition assistance to be superimposed on the boundary which has the predetermined shape is different from colors of both of the right and left recognition assistances.

10. The method according to claim 1,
wherein the sensor image includes an infrastructure image representing an image generated based on data obtained from an infrastructure camera whose distance from the moving body is equivalent to or less than a predetermined value,
wherein the terminal further includes a display which displays the infrastructure image,
wherein the method further comprises the steps of:
setting right and left regions with respect to the front of the moving body in the infrastructure image by using the virtual space in which the right and left spaces are defined;
superimposing right and left recognition assistances respectively on the right and left regions of the infrastructure image, in which a color of the right recognition assistance to be superimposed on the infrastructure image is a similar color to a color of the right recognition assistance to be superimposed on the moving body image and a color of the left recognition assistance to be superimposed on the infrastructure image is a similar color to a color of the left recognition assistance to be superimposed on the moving body image; and
outputting the infrastructure image on which the right and left recognition assistances are superimposed from the display which displays the infrastructure image.

11. The method according to claim 10, further comprising the steps of:
setting an additional reference line which is orthogonal to the reference line on the virtual horizontal plane; and
defining right front, left front, right rear, and left rear spaces by dividing, into two parts, each of the right and left spaces in the front-rear direction of the moving body by using the additional reference line,
wherein, when the right front, left front, right rear, and left rear spaces are defined, in the step of setting the right and left regions with respect to the front of the moving body in the infrastructure image, right front, left front, right rear, and left rear regions with respect to the front of the moving body are set in the infrastructure image, wherein, when the right front, left front, right rear, and left rear spaces are defined, in the step of superimposing the right and left recognition assistances respectively on the right and left regions of the infrastructure image, right front, left front, right rear, and left rear recognition assistances are superimposed respectively on the right front, left front, right rear, and left rear regions, wherein a color of the right front recognition assistance to be superimposed on the infrastructure image is different from a color of the right rear recognition assistance, and a color of the left front recognition assistance to be superimposed on the infrastructure image is different from a color of the left rear recognition assistance.

12. The method according to claim 1, wherein the terminal further includes a display which displays a map image of a periphery of the moving body, wherein the method further comprising the steps of:

superimposing on the map image an icon of the moving body and right and left pictograms which surround the icon of the moving body with respect to the front of the moving body, in which a color of the right pictogram is a similar color to a color of the right recognition assistance to be superimposed on the moving body image and a color of the left pictogram is a similar color to a color of the left recognition assistance to be superimposed on the moving body image; and outputting the map image on which the icon of the moving body and the right and left pictograms are superimposed from the display which displays the map image.

13. A remote image display method to display a sensor image generated based on data obtained from a remote sensor on a display of a terminal communicating with the remote sensor, the sensor image including an infrastructure image representing an image generated based on data obtained from an infrastructure camera whose distance from a moving body is equivalent to or less than a predetermined value, comprising the steps of:

setting a reference line which extends in a front-rear direction of the moving body on a virtual horizontal plane which passes through a reference point of the moving body;

defining right and left spaces with respect to front of the moving body in a virtual space which includes the virtual horizontal plane by using the reference line;

setting right and left regions with respect to the front of the moving body in the infrastructure image by using the virtual space in which the right and left spaces are defined;

superimposing right and left recognition assistances respectively on the right and left regions of the infrastructure image, in which a color of the right recognition assistance is different from a color of the left recognition assistance; and outputting the infrastructure image on which the right and left recognition assistances are superimposed from the display, wherein the right and left recognition assistances include coloring applied to circular arcs concentrically drawn on the virtual horizontal plane around the reference point of the moving body.

14. A remote image display system to display a sensor image generated based on data obtained from a remote sensor on a display of a terminal communicating with the remote sensor, the remote sensor including a sensor mounted on a moving body, the sensor image including a moving body image representing an image generated based on data obtained from the sensor mounted on the moving body, wherein the moving body is configured to:

set a reference line which extends in a front-rear direction of the moving body on a virtual horizontal plane which passes through a reference point of the moving body;

define right and left spaces with respect to front of the moving body in a virtual space which includes the virtual horizontal plane by using the reference line;

set right and left regions with respect to the front of the moving body in the moving body image by using the virtual space in which the right and left spaces are defined; and superimpose right and left recognition assistances respectively on the right and left regions of the moving body image, a color of the right recognition assistance being different from a color of the left recognition assistance; and transmit the moving body image on which the right and left recognition assistances are superimposed to the terminal, wherein the terminal is configured to output the moving body image on which the right and left recognition assistances are superimposed from the display, wherein the right and left recognition assistances include coloring applied to circular arcs concentrically drawn on the virtual horizontal plane around the reference point of the moving body.

* * * * *